(12) United States Patent
Ohmura et al.

(10) Patent No.: US 6,424,806 B1
(45) Date of Patent: Jul. 23, 2002

(54) CAMERA HAVING INTERLOCK PREVENTING SIMULTANEOUS USE OF ELECTRONIC ZOOM AND PANORAMIC FORMAT

(75) Inventors: Hiroshi Ohmura; Seimei Ushiro, both of Saitama; Tsutom Tanaka, Tokyo, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/453,816

(22) Filed: Dec. 3, 1999

(30) Foreign Application Priority Data

Dec. 3, 1998 (JP) .......................................... 10-344193
Dec. 3, 1998 (JP) .......................................... 10-344194
Feb. 4, 1999 (JP) .......................................... 11-027045

(51) Int. Cl.[7] .......................... G03B 17/00; G03B 17/24
(52) U.S. Cl. .......................... 396/60; 396/299; 396/319; 396/543

(58) Field of Search .................... 396/60, 319, 297, 396/299, 435, 543

(56) References Cited

U.S. PATENT DOCUMENTS

| 5,389,988 A | * | 2/1995 | Daitoku ........................ 396/60 |
| 5,659,809 A | * | 8/1997 | Nagao ........................... 396/60 |
| 5,787,313 A | * | 7/1998 | Compton et al. ............. 396/80 |

\* cited by examiner

*Primary Examiner*—Russell Adams
*Assistant Examiner*—Arthur A Smith
(74) *Attorney, Agent, or Firm*—Young & Thompson

(57) ABSTRACT

A camera adapted to APS is equipped with an optical zooming feature and a feature of entering a demand of electronic zooming by which information regarding a zooming ratio readable to make a print from a frame of a negative film at a print magnification corresponding to a demanded zooming ratio by a printer is recorded on the film loaded therein.

14 Claims, 27 Drawing Sheets

CAMERA HAVING INTERLOCK PREVENTING SIMULTANEOUS USE OF ELECTRONIC ZOOM AND PANORAMIC FORMAT

BACKGROUND OF THE INVENTION

1. Field of the Invention

The present invention relates to a camera of the type which is adapted to record information regarding print formats designated for exposed frames on a film which is read and used to make prints in the designated print formats from the negative film in a printing system.

2. Description of the Related Art

In recent years, as one of printing systems of this type, Advanced Photo System (APS) has become popular in the photographic field. Cameras suitably adapted to APS on the market, which has always made exposures of a film loaded therein in a standard format through a standard exposure aperture frame, can selectively designate available print formats, such as conventional, high-vision and panoramic, for exposed frames of the film and record optical or magnetic information of the designated print formats which are used to make prints of the exposed frame in the designated print format. In APS the conventional print format, which is referred to as a "C" print format, has a print size of 15.6×22.3 mm, the high-vision print format, which is referred to as an "H" print format, has a print size of 15.6×27.4 mm, and the panoramic print format, which is referred to as a "P" print format, has a print size of 9.6×27.4 mm. After development of a film exposed by such a camera, a printer automatically reads the information for each exposed frame on the film and make a print of a central portion of the exposed frame according to the designated print format. Because the camera adapted to APS is not necessary to change the format of exposure aperture, mechanically or physically, even while the camera can be miniaturized and is provided at low costs, it is quick and easy to designate a desired print format for each exposed frame.

In addition to the feature of print format designation, what is called "electronic zooming" has been proposed as a pseudo-zooming function in APS. In a camera equipped with the feature of electronic zooming, when entering a demand for electronic zooming, information regarding an entry of an electronic zooming demand or an entry of a zooming ratio is recorded on an information recording area of each exposed frame on a film, optically or magnetically. The information is read and used to make a print of a central portion of the exposed frame at a print magnification according to the designated zooming ratio. Cameras which are equipped with a zoom lens and have an electronic zooming feature can provide a print with an image with a resultant zooming effect greater than a greatest optical zooming (zooming by a zoom lens) effect obtainable by the zooming lens. A device that has been contrived in connection with such a camera is a rocking optical zooming switch such as described in, for example, Japanese Utility Model No. 2550828, which is designed and adapted to cause the zoom lens to shift toward the telephoto end while pushed at one of its opposite ends and toward the wide-angle end while pushed at another end and further to effect an entry of an electronic zooming demand when pushed at its center portion between the opposite ends. While this rocking optical zooming switch is convenient in light of that both optical zooming and electronic zooming are effected through a single operating member, it difficult to distinguish part of the zooming switch for electronic zooming from parts for optical zooming, visually and feelingly, as a result of which it is worried about that the optical zooming switch is accidentally operated at the center portion while operated to effect optical zooming.

There have not yet been brought up realistic problems of incorporating the electronic zooming feature into the feature of print format designation nor any solution for the problems. In APS, the print magnification depends upon print formats designated during taking a photograph. Specifically, when letting a print magnification for the "H" print format be ×1, the print magnification is ×1 for the "C" print format and ×1.7 for the "P" print format. This causes the potential problem that, while image quality of prints made in these print formats is satisfied, prints made in the "P" print format, strictly speaking, are inferior in image quality to prints made from the "H" or the "C" print format. In the APS print process into which the electronic zooming feature is involved, when letting a zooming ratio be ×1.7 which is the print magnification for the "P" print format, the resultant print magnification are ×1.7, ×1.7 and ×2.9 for "H", "C" and "P" print format, respectively. The print magnification ×2.9 is too great, so as thereby to cause further aggravation of image quality for the "P" format prints which is unacceptable. While it is possible to provide high image quality of prints even made in the "P" print format by using films with improved granularity and sharpness, however, there possibly occurs aggravation of image quality of prints made in various print formats in APS process although latent images on a film is not affected in quality by the electronic zooming and/or the designation of print formats. This is because both print format designation and electronic zooming are primarily carried out as a preliminary operation, mechanically and physically or optically, and manifested as an pseudo effect during making prints. The propriety of combinations of various print formats and electronic zooming ratios depends on properties and formats of photographic films for use with the camera, print formats that are regularly employed, etc. and, therefore, improper combinations have to be prohibited from being affected. For example, when the "P" print format is designated, an entry of an electronic zooming demand must be prevented. If trusting an elimination of such an unacceptable combination of a print format and a zooming ratio to photographers, the camera conveys an impression of inconvenient operation because the photographer has to make exposures in consideration of unacceptable combinations of print formats and electronic zooming ratios. Moreover when trusting the elimination of the unacceptable combinations of print formats and zooming ratios possibly, it is difficult to protect the photographer from selecting an unacceptable combination.

SUMMARY OF THE INVENTION

It is therefore an object of the present invention to provide a camera which can designate print formats and zooming ratios selectively in combination It is therefore another object of the present invention to provide a camera which can indicate a selection of an unacceptable combination of zooming ratios and print formats.

It is therefore still another object of the present invention to provide a camera which enables photographers to effect both an entry of electronic zooming demand and designation of print format safely, easily and securely.

In order to achieve the foregoing object of the present invention, the camera equipped with a power-driven zoom lens installed thereto which comprises:

an information recording device operative to record information on a film loaded in the camera;

an optical zooming member capable of rocking in opposite directions about a pivot axis perpendicular to an optical axis of the zoom lens to drive the zoom lens in opposite directions along the optical axis between the telephoto end and a wide-angle end; and an electronic zooming demand entry member installed into a center portion of the optical zooming member and movable in the optical axis relatively to the optical zooming member, the electronic zooming demand entry member, when moved, effects an entry of an electronic zooming demand for an exposed frame of the film by causing the information recording device to record information regarding the entry of an electronic zooming demand on the film.

In the camera, the optical zooming member and the electronic zooming demand entry member are independently operated to effect optical zooming and entering an electronic zooming demand, respectively. It is easy to distinguish between operating members for optical zooming and electronic zooming, so as to eliminate operational fails. An arrangement of these two members at the same position, more specifically, the arrangement in which the electronic zooming demand entry member is installed into a center portion of the optical zooming member makes a photographer to shift a fingers to the electronic zooming demand entry member from the optical zooming member without taking off the finger at a moment when the photographer intends to effect the electronic zooming in the course of effecting the optical zooming while the photographer views a scene through a view finder, so as thereby to realize the photographer's intention without missing a shutter chance.

According to a preferred embodiment of the camera, the electronic zooming demand entry member at an outside end projects away from an outside surface of the optical zooming member in the direction so as to move toward the first operating member. This makes the photographer perceive the electronic zooming demand entry member from a feeling of the finger while operating the optical zooming member, which improves easy operation of the members.

The electronic zooming demand entry member and the optical zooming member may be colored differently. This improves clear visual perception of the electronic zooming demand entry member and improvement of easy operation of the members.

In order to achieve the foregoing object of the present invention, the camera which is of a type able to selectively designate a plurality of print formats for an exposed frame of a film loaded therein which is used to make a print from the exposed frame of the film after development in a designated print format by a printer and to enter an electronic zooming demand for an exposed frame of the film which is used to make a print from the exposed frame of the film after development at a demanded zooming ratio by the printer, comprises:

an information recording device operative to record information on a film loaded in the camera;

a print format designation member movable between a plurality of positions assigned to a plurality of print formats, respectively, and operative to effect designation of the print formats according to the positions by causing the information recording device to record information regarding the print format for an exposed frame of the film on the film according to the position into which the print format designation member is moved;

an electronic zooming demand entry member operative to make a mechanical action through which an entry of an electronic zooming demand is effected for an exposed frame of the film by causing the information recording device to record information regarding the entry of an electronic zooming demand on the film; and a blocking mechanism operative to block the electronic zooming demand entry member so as to prevent the electronic zooming demand entry member from making the mechanical action while the print format designation member designates a specific one of the print formats or to permit the electronic zooming demand entry member to make the mechanical action while the print format designation member designates the remaining ones of the print formats other than the specific print format In the camera, when a predetermined unacceptable print format is designated in combination of an entry of an electronic zooming demand, the electronic zooming demand entry member is disabled to make a mechanical action necessary to enter an electronic zooming demand, so as to eliminate a fail to set the camera in the unacceptable combination.

According to a preferred embodiment of the camera, wherein the print format designating member slides between the position for the specific print format and the positions for the remaining print formats and the blocking mechanism prevents the mechanical action of the electronic zoming demand entry member in the position for the specific print format or permits the mechanical action of the electronic zooming demand entry member in the positions for the remaining print formats. The blocking mechanism may be having a part entering, or otherwise escaping from, a path of movement of the electronic zooming demand entry member so as to prevent the electronic zooming member to act mechanically. The blocking mechanism may comprise a blocking lever which is formed as a part of the print format designation member and is placed in a path of the mechanical action of the electronic zooming demand entry member so as thereby to prevent the mechanical action of the electronic zooming demand entry member in the position for the specific print format According to another preferred embodiment of the present invention the camera may further comprise a power-driven zoom lens installed to the camera and capable of shifting in focal length and an optical zooming member capable of rocking in opposite directions about a pivot axis perpendicular to an optical axis of the zoom lens to drive the zoom lens in opposite directions along the optical axis between a telephoto end and a wide-angle end, wherein the electronic zooming demand entry member comprises a push button installed in the optical zooming member in an approximately center position of the optical zooming member. During effecting the zooming function of the camera, i.e. optical zooming or electronic zooming, both zooming members are operable at the same position.

The camera may be of a type for use with a film adapted to Advanced Photo System. In such a case, the print format may include at least a panoramic print format as the specific format, a conventional print format and a high vision print format.

In order to achieve the foregoing object of the invention, the camera which is of a type able to selectively designate a plurality of print formats for an exposed frame of a film loaded therein which is used to make a print from the exposed frame of the film after development in a designated print format by a printer and to enter an electronic zooming demand for an exposed frame of the film which is used to make a print from the exposed frame of the film after development at a demanded zooming ratio by the printer, comprises:

an information recording device operative to record information on a film loaded in the camera;

a print format designation member movable between a plurality of positions assigned to different print formats, respectively, and operative to effect designation of the print format for an exposed frame of the film according to the positions by causing the information recording device to record information regarding the position into which the print format designation member is moved on the film;

an electronic zooming demand entry member operative to effect an entry of an electronic zooming demand for the exposed frame of the film by causing the information recording device to record information regarding the electronic zooming demand on the film; and refusing means for refusing a combination of the entry of the electronic zooming demand and designation of a specific one of the print formats.

According to the camera having the refusing means for for refusing a combination of the entry of the electronic zooming demand and designation of a specific one of the print formats, it is possible to incorporate both features of print format designation and electronic zooming demand entry.

The refusing means may cause the information recording device to record information indicating the designation of the specific print format when the print format designation member is moved to the position assigned to the specific print format and information indicating no entry of the electronic zooming demand even when the electronic zooming demand entry member is operated to effect an entry of the electronic zooming demand. Otherwise, the refusing means causes the information recording device to record information indicating the designation of the print format other than the specific print format which is allowed to be designated in combination with the entry of the electronic zooming demand even when the print format designation member is moved to the position assigned to the specific print format and information indicating an entry of the electronic zooming demand when the electronic zooming demand entry member is operated to effect the entry of the electronic zooming demand. In this case, the unacceptable combination of a print format and an electronic zooming demand entry is automatically escaped by changing the print format The refusing means preferably disables the electronic zooming demand entry member from operating when the print format designation member is moved to the position assigned to the specific print format.

The camera may be provided with indication means for indicating that the combination of the entry of the electronic zooming demand and the designation of the specific print formats. This makes photographers know that an entry of an electronic zooming demand is made in combination with an unacceptable print format.

The information recording device is preferably located in a specified position relative to an exposure aperture of the camera. This makes it possible to record information during advancing the film so as to place an exposure frame next to the exposed frame in position.

BRIEF DESCRIPTION OF THE DRAWINGS

The foregoing and other objects and features will be clearly understood when reading the following description directed to preferred embodiments thereof in conjunction with the accompanying drawings, in which same reference numerals have been used to denote the same or like parts or mechanisms and steps throughout the drawings and wherein.

DETAILED DESCRIPTION OF THE PREFERRED EMBODIMENTS

In the following description, parts which are not of direct importance to the invention and parts which are purely of conventional construction and operation will not be described in detail. For example, details of the shutter mechanism, the exposure mechanism, the magnetically recording device, etc. which are necessary to the camera will not be set out in detail since their construction and operation can easily arrived at by those skilled in the art. The term "electronic zooming" as used herein shall mean and refer to the function by which information regarding a zooming ratio which is read to make a print form a specified area of a frame of a negative film at a print magnification corresponding to the zooming ratio by a printer is recorded on the film, and the term "optical zooming " as used herein shall mean and refer to the function of zooming an image by changing the focal length of a zooming lens between the telephoto end and the wide-angle end.

Figure 1:
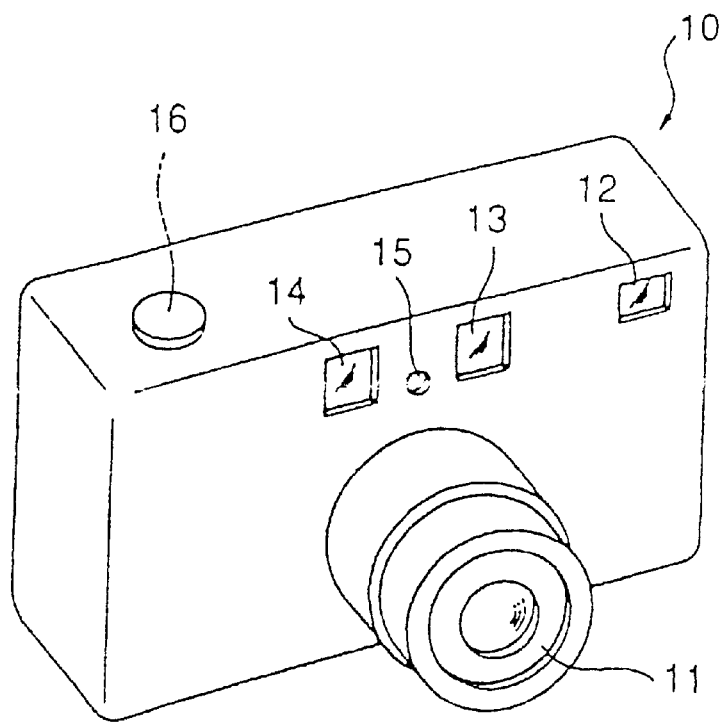
FIG. 1 is a perspective front view of a camera in accordance with an embodiment of the invention.
Figure 2:
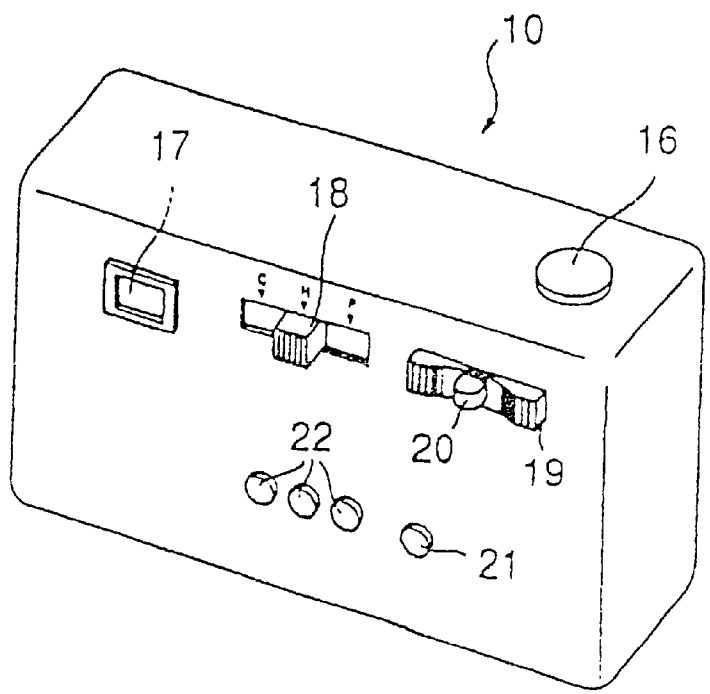
FIG. 2 is a perspective rear view of the camera shown in FIG. 1.
Figure 3:
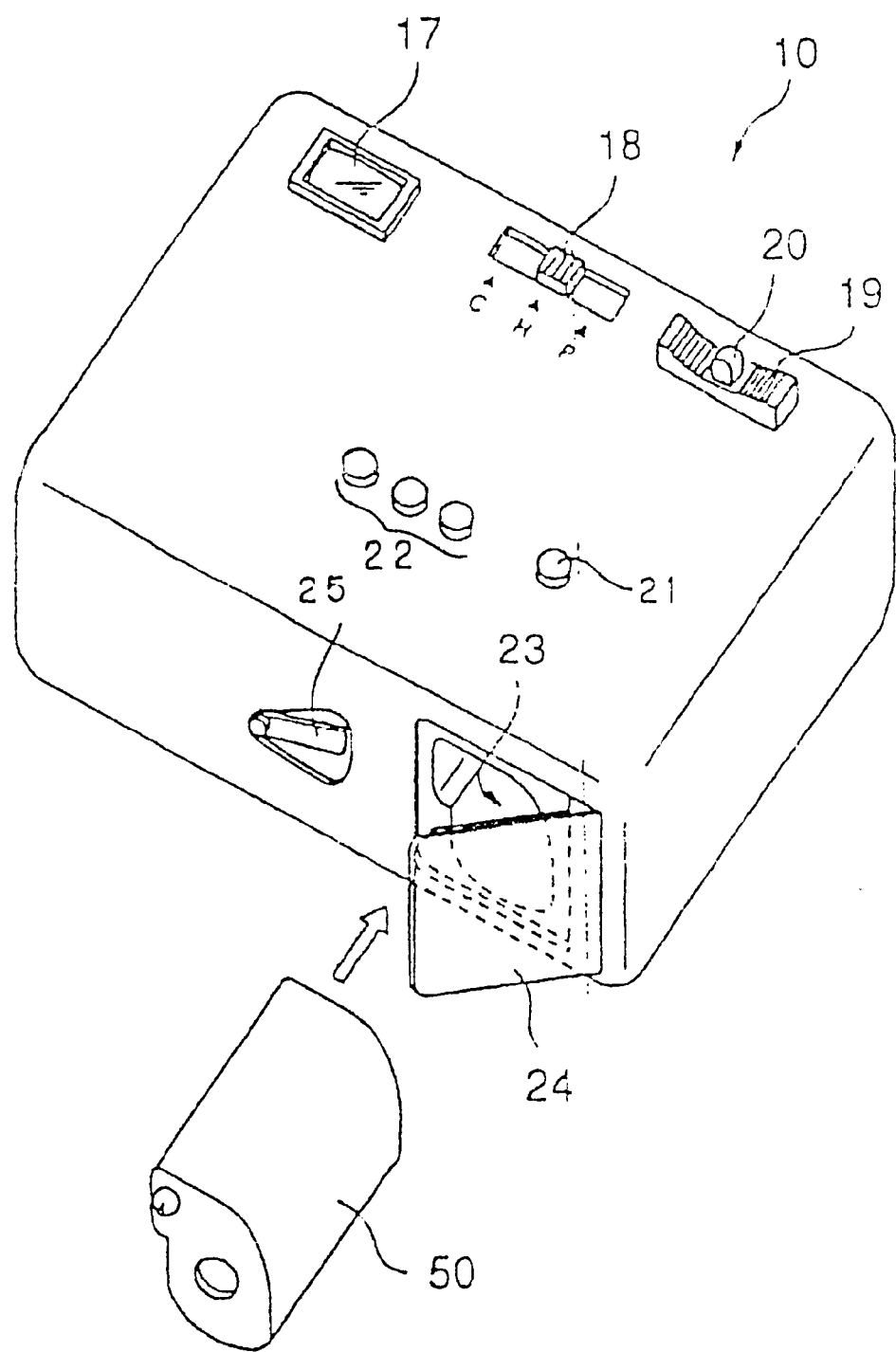
FIG. 3 is a perspective bottom view of the camera shown in FIG. 1.

Referring to the drawings, and in particular, to FIGS. 1 through 3 showing a camera 10 in accordance with a preferred embodiment of the invention, the camera 10 is provided on its front wall of the camera body with a zoom lens barrel 11 in which an optical zoom lens system (not shown) is installed, a finder objective window 12, a light emitting window 13 and light receiving window 14 for an automatic focusing system, and a light metering window 15 for an automatic exposure system. A shutter button 16 is installed on a top wall of the camera body. As shown in detail, the camera 10 is further provided on its back wall with a finder eyepiece window 17, a print format designation switch 18, such as a slide switch, for entering magnetic information concerning a print format selected among possible print formats, namely a conventional print format (which is hereafter referred to as a "C" print format), a high-vision print format (which is hereafter referred to as an "H" print format) and a panoramic print format (which is hereafter referred to as a "P" print format), a two-way optical zooming lever 19 for continuously changing a zoom ratio or focal length of the optical zoom lens, an electronic zooming demand entry switch 20, such as a button switch for entering magnetic information concerning electronic zooming, a power switch 21, and other various camera operating buttons 22. The camera 10 at one of its opposite sides is formed with a film cartridge chamber 23 into which a film cartridge 50 containing an APS film is inserted from the bottom and which is closed by a bottom lid 24 hinged to the camera body. The bottom lid 24 is locked in its closed position by a lock lever 25. The film cartridge 50 contains a roll of APS film wound around of a spool therein and is provided with a light block (not shown) operative to prevent ambient light from entering the cartridge interior through a film egress/ingress slot. The light block is prevented from photographer from access thereto and automatically operated by a mechanism of the camera 10. The film cartridge 50 has a bar code (not shown) in the cartridge interior which is watched through a window formed in one of the end walls. The lock lever 25 is operated to open the bottom lid 24, and then the film cartridge 50 is loaded into the film cartridge chamber 23 in a direction indicated by an arrow. In cooperation with closing the lid 24, the light block is rotated to open the film egress/ingress slot and prescribed camera operation is subsequently automatically caused. Specifically, in this instance, the film is initially moved in a winding direction so as to be further wound onto the spool. During this initial movement of the film, the camera 10 judges whether or not the film in the film cartridge 50 loaded therein is unexposed or partly or completely exposed and detects the film speed of the film. When the film is judged to be unexposed, the film is then unwound off the spool and moved out of the film cartridge 50 until a first exposure frame is located in an exposure aperture of the camera 10.

Figure 4:
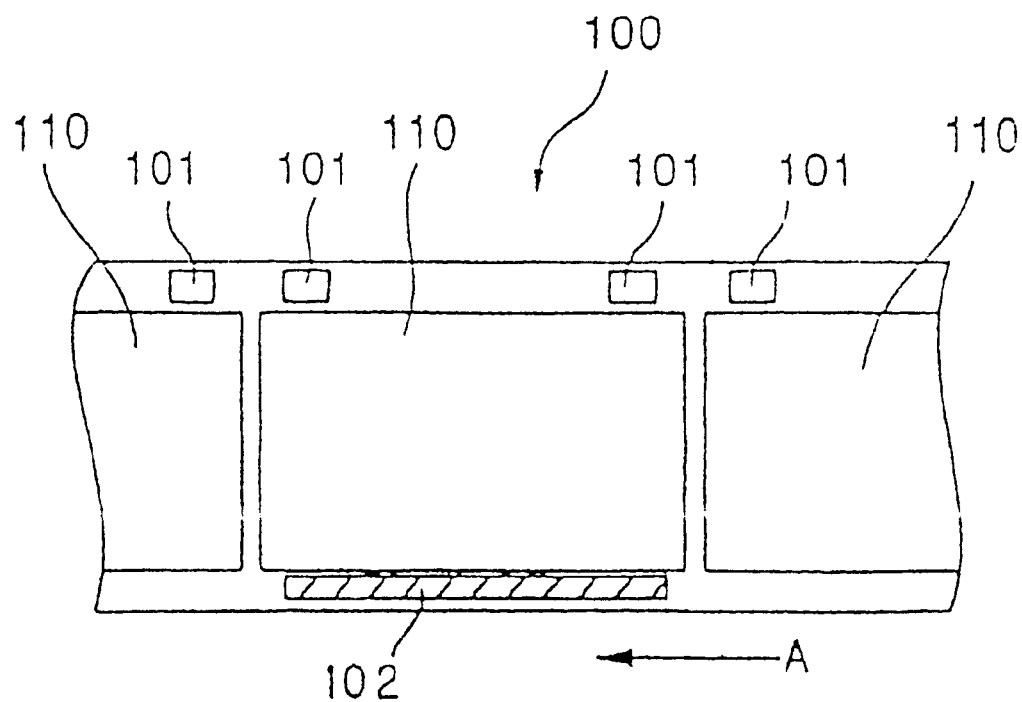
FIG. 4 is a plane view of a film strip that is enclosed in a film cartridge showing a film format.

FIG. 4 schematically shows part of an APS film strip 100 contained in the film cartridge 50. The film strip 100 is advanced in a direction A in the camera 10. The film strip 100 is formed with two perforations 101 on one of opposite sides of each exposure frame 110. Each perforation 101 is located close to each end of the exposure frame 110 and within an extent of the exposure frame 110. The film strip 100 has a magnetic information recording area 102 on another one of the opposite sides of each exposure frame 110 for magnetically recording information, such as a print format and information of electronic zooming, peculiar to the exposure frame 110. In this instance, the magnetic information recording area 102 is part of a transparent magnetic coating over the entire area of the film strip 100. As will be described later, even when any one of the possible print formats is selected in the camera 10, each exposure frame 110 of the film strip 100 is filly exposed over the full exposable area in spite of the selected print format.

Figure 5:
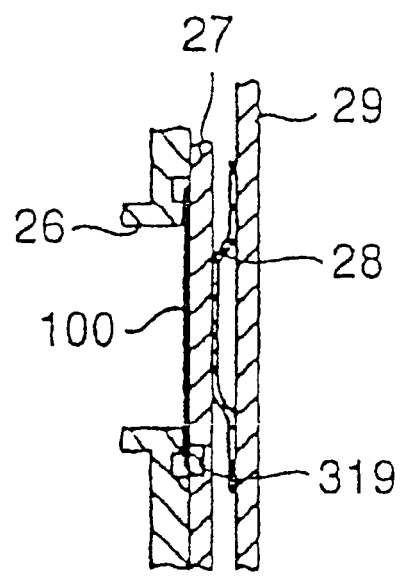
FIG. 5 is a cross sectional view of an exposure aperture of the camera of the camera shown in FIGS. 1 through 3.

FIG. 5 shows a cross-section of the film strip 100 in an exposure aperture of the camera 10. As shown, the film strip 100 is advanced in a direction perpendicular to the plane of the drawing between an aperture frame 26 and a pressure plate 27. The aperture frame 26 defines an exposure area on the film strip 100 to light passing through the optical zoom lens from the left as viewed in FIG. 5. The pressure plate 27 is urged by a leaf spring 28 attached to a camera back cover 29 to press the film strip 100 against the aperture frame 26 from the back, so as to hold the film strip 100 even in a direction spatially perpendicular to the optical axis of the optical zoom lens. A magnetic recording head 319, which is disposed below the aperture frame 26 between the exposure frame 26 and the pressure plate 27, magnetically records information concerning electronic zooming and print format on the magnet information recording area 102 immediately after exposure of each exposure frame 110.

Figure 6:
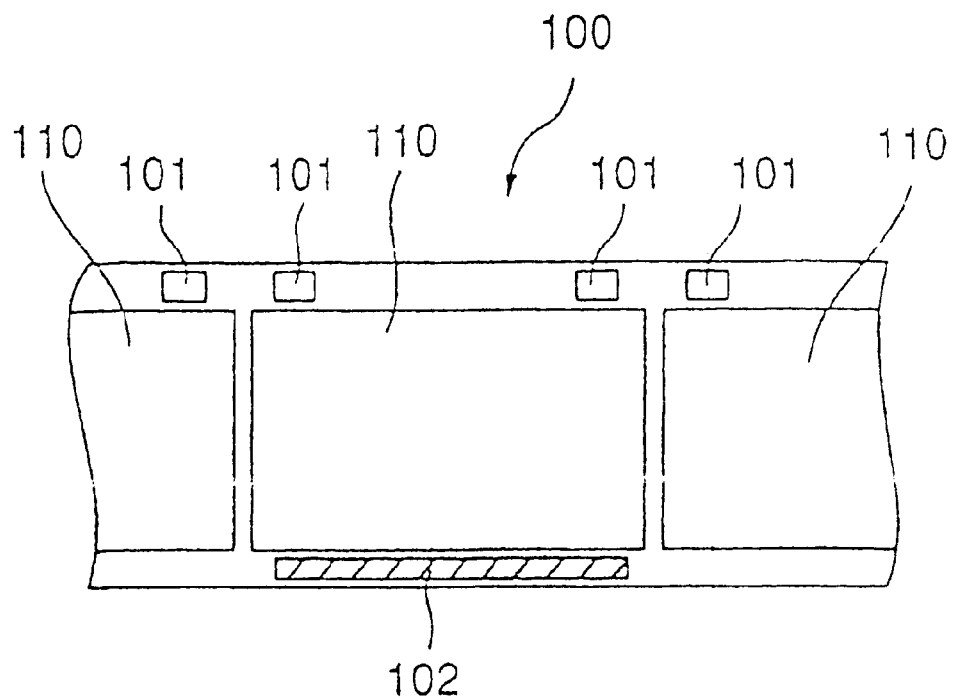
FIG. 6 is a plane view of a part of the film strip showing an "H" print format.
Figure 7:
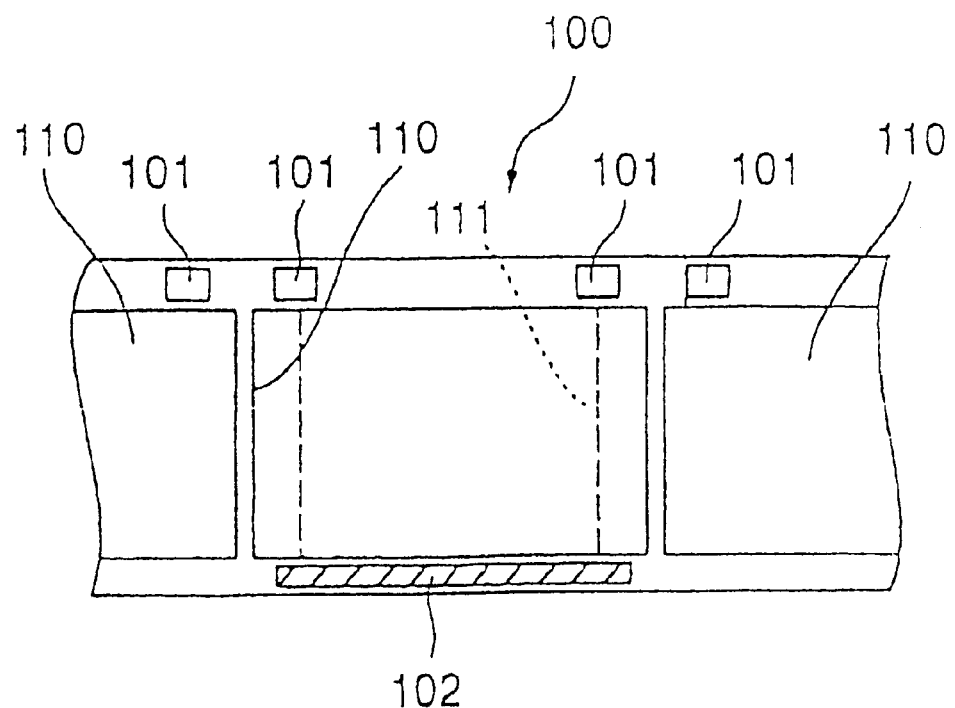
FIG. 7 is a plane view of a part of the film strip showing a "C" print format.
Figure 8:
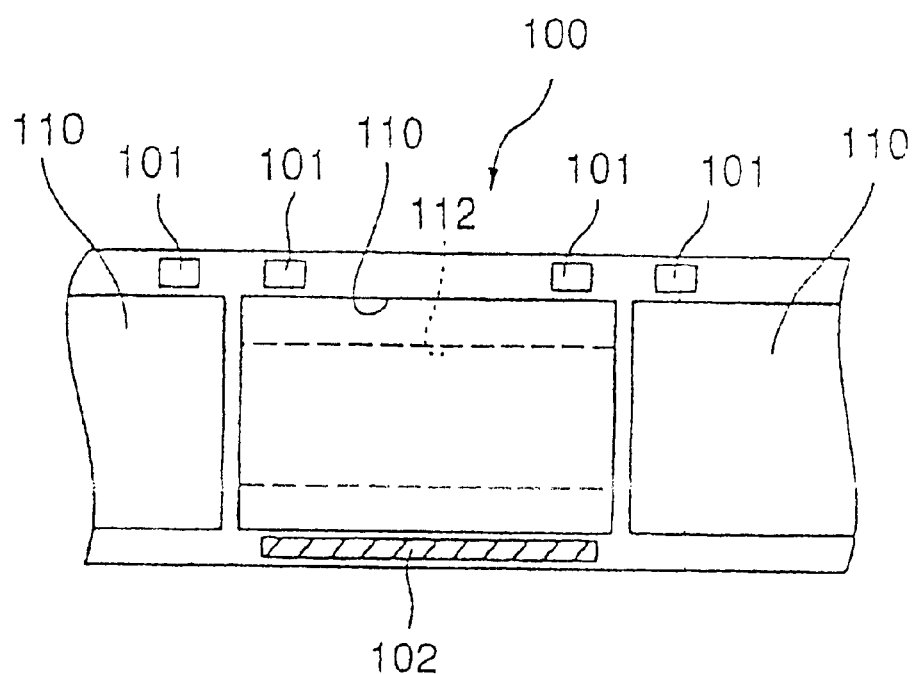
FIG. 8 is a plane view of a part of the film strip showing a "P" print format.

FIGS. 6 to 8 show print areas of exposure frames 110 of the film strip 100 pictures of which are printed according to selected print formats, i.e. the "C" print format, the "H" print format and the "P" print format. When the "C" print format is designated for an exposure frame 110 before or after exposure of the exposure frame 110 by operating the print format designation switch 18, the magnetic recording head 319 magnetically records magnetic information indicating designation of the "C" print format on the magnetic information recording area 102. A printer, which is designed and adapted to read magnetic information on the magnetic information recording areas 102 and change print formats according to the magnetic information, makes a print of a full exposure area of each exposure frame 110 of the film strip 100. In this instance, in consideration of position errors and the like during printing, it is preferred for the printer to make a print of, for instance, 16.7×30.2 mm, which is slightly wider than the regular format of APS film strip 100, for the "H" print format. However, for an easy understanding, the margin of an exposure aperture of the printer is disregarded in the following description and the full size of exposure frame 110 of the APS film strip 100 is taken as an "H" print format. During making prints from the developed film strip 100, when the printer reads the magnetic information indicating the "H" print format on the magnetic information recording area 102 of an exposure frame 110, it automatically changes its print format to the "H" print format, so as to make a print of the full area of the exposure frame 110 as shown in FIG. 6. When the "C" print format is designated for an exposure frame 110 before or after exposure of the exposure frame 110 by operating the print format designation switch 18, the magnetic recording head 319 magnetically records magnetic information indicative of the designation of the "C" print format on the magnetic information recording area 102. During making prints from the developed film strip 100, when the printer reads the magnetic information indicating the "C" print format on the magnetic information recording area 102 of the exposure frame 110, it automatically changes its print format to the "C" print format, so as to make a print of a narrow area 111 of the exposure frame 110 which is defined between chained lines as shown in FIG. 7. The print magnification is the same in both the "C" print format and the "H" print format. Further, When the "P" print format is designated for an exposure frame 110 before or after exposure of the exposure frame 110 by operating the print format designation switch 18, the magnetic recording head 319 magnetically records magnetic information indicative of the designation of the "P" print format on the magnetic information recording area 102. During making prints from the developed film strip 100, when the printer reads the magnetic information indicating the "P" print format, it changes its print format to the "P" print format, so as to make a print of a narrow area 112 of the exposure frame 110 which is defined between chained lines as shown in FIG. 8. the print magnification in the "P" print format is ×1.7 relative to the print magnification ×1 in the "H" print format.

Figure 9:
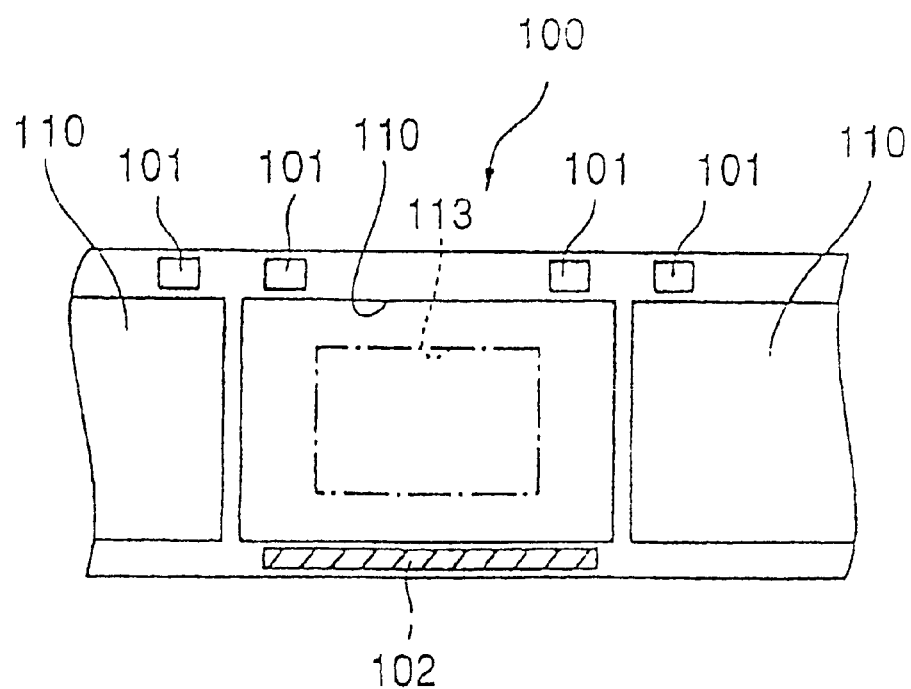
FIG. 9 is a plane view of a part of the film strip showing the "H" print format when electronic zooming is effected.
Figure 10:
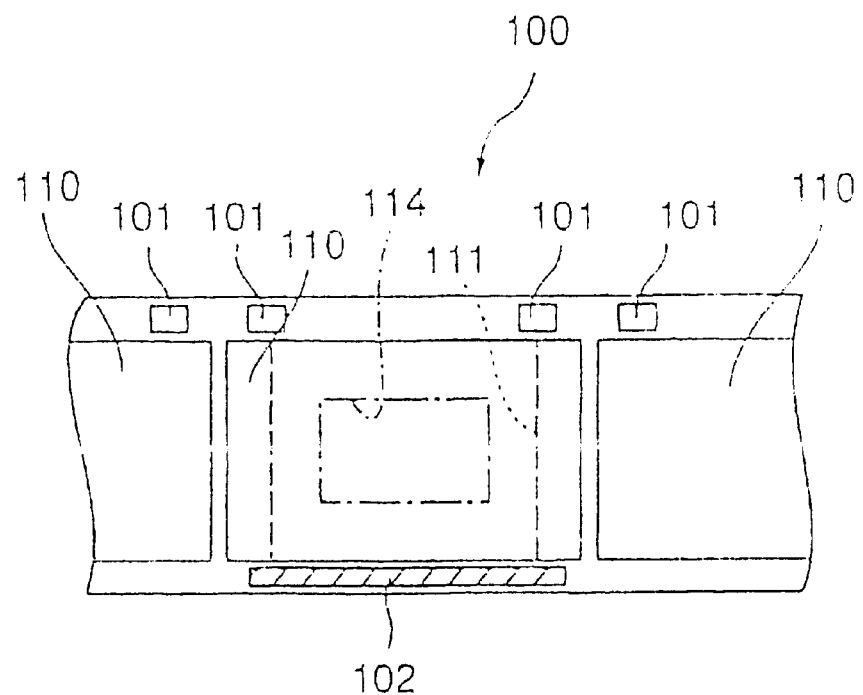
FIG. 10 is a plane view of a part of the film strip showing the "C" print format when electronic zooming is effected.

FIGS. 9 and 10 show print areas of exposure frames 110 of the film strip 100, pictures of which are printed according to electronic zooming. FIG. 9 shows a print area defined by a dotted line when the "T" print format and electronic zooming are designated and demanded for an exposure frame 110 before or after exposure of the exposure frame 110 by operating the print format designation switch 18 and the electronic zooming demand entry switch 20, respectively. FIG. 10 shows a print area defined by a dotted line when the "C" print format and electronic zooming are designated and demanded for an exposure frame 110 before or after exposure of the exposure frame 110 by operating the print format designation switch 18 and the electronic zooming demand entry switch 20, respectively. In this instance, a combination of the "P" print format designation and an entry of an electronic zooming demand is prohibited for the reason described later. In the following description, the print magnification when no electronic zooming is demanded is given as a relative magnification to a magnification ×1 in the "H" print format.

In this embodiment, electronic zooming provides a single fixed zooming ratio. Specifically, when electronic zooming is demanded, a print magnification is ×1.7. Accordingly, in the case where the "H" print format is designated, a center area 113 of a magnification ×1/1.7 as small as a print area of a full exposure frame 110 in the "H" print format is printed as shown in FIG. 9 when electronic zooming is demanded. In consequence, in the "H" print format, the print magnification when no electronic zooming is demanded is ×1.7 relative to a print magnification ×1 when electronic zooming is demanded. On the other hand, when the "C" print format is designated in addition to a demand of electronic zooming, a center area 113 of a magnification ×1/1.7 as small as a print area 111 of an exposure frame 110 in the "C" print format is printed as shown in FIG. 10. In consequence, in the "C" print format, the print magnification when no electronic zooming is demanded is ×1.7 relative to a print magnification ×1 when electronic zooming is demanded.

Considering a case where it is possible to designate the "P" print format and demand electronic zooming together, as described above, the print magnification in the "P" print format is ×1.7 even when no electronic zooming is demanded relatively to the magnification ×1 in the "H" print format when no electronic zooming is demanded, and further, the print magnification in the "P" print format is ×1.7 when electronic zooming is demanded relatively to that when no electronic zooming is demanded. That is to say, when electronic zooming is demanded in the "P" print format, the print magnification is approximately ×2.9 as large as that in the "H" print format when no electronic zooming is demanded. As apparent, the combination of the "P" print format and electronic zooming makes a print magnification too large, which causes aggravation of image qualities of a print. For this reason, it is prohibited in the camera 10 to designate the "P" print format together with demanding electronic zooming.

Figure 11:
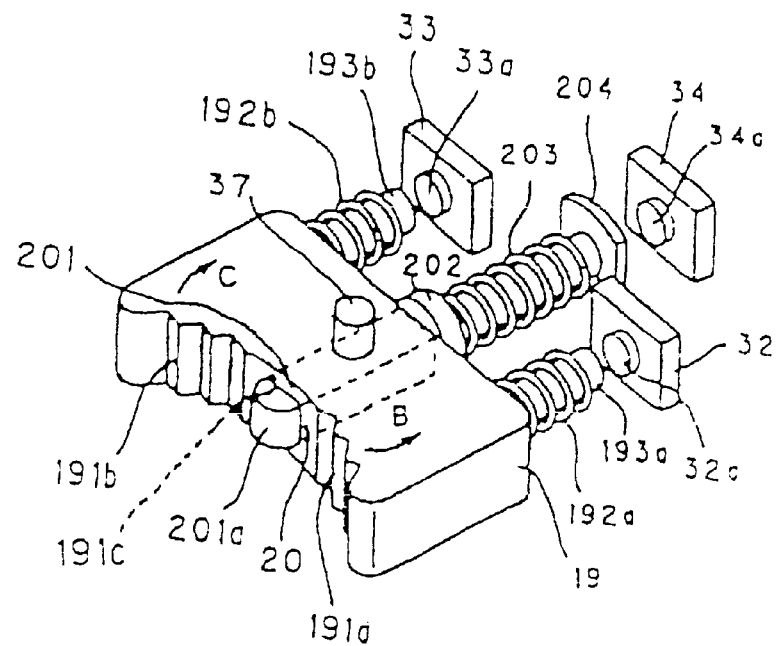
FIG. 11 is a perspective view of a switch mechanism for optical zooming and an electronic zooming demand entry.

FIG. 11 shows the print format designation switch 18 and the electronic zooming demand entry switch 20 and their associated members in detail. The two-way optical zooming lever 19 is pivoted for rotation on a pivot shaft 37 secured to the camera body 30. Pushing the two-way optical zooming lever 19 at one of opposite ends 191a and 191b, for instance the end 191a, causes the two-way optical zooming lever 19 to turn in a counterclockwise direction B as viewed in the figure, so as to force a contact rod 193b against a coil spring 192a to come into contact with a switch contact 32a of a tact switch 32. While the switch contact 32a of the tact switch 32 remains contacted by the contact rod 193b, the zoom lens barrel 11 is driven to shift the optical zoom lens toward a telephoto end. Releasing the two-way optical zooming lever 19, the rod contact 193b is forced back by the coil spring 192a to return into its neutral position for disconnection from the switch contact 32a of the tact switch 32. Similarly, pushing the two-way optical zooming lever 19 at another end 191b causes the two-way optical zooming lever 19 to turn in a clockwise direction A as viewed in the figure to force a contact rod 193b against a coil spring 192b to come into contact with a switch contact 33b of a tact switch 33. While the switch contact 33b of the tact switch 33 remains contacted by the contact rod 193b, the zoom lens barrel 11 is driven to shift the optical zoom lens toward a wide-angle end. Releasing the two-way optical zooming lever 19, the rod contact 193b is forced back by the coil spring 192b to return into its neutral position for disconnection from the switch contact 33b of the tact switch 33. The two-way optical zooming lever 19 at its center is formed with a bore 191c in which a switch button 201 in a form of a push rod is inserted such that it is prevented from slipping off by a stopper ring 202. An acorn head 201a of the switch button 201 projects away from the surface of the two-way optical zooming lever 19. The electronic zooming demand entry switch 20 is turned on by pushing the switch button 201 against a coil spring 203 so as to bring the switch contact 204 at the top of the switch button 201 into contact with a switch contact 34a b of a tact switch 34. Releasing the switch button 201, the switch button 201 is forced back by the coil spring 203 to return into its neutral position, so as to turn off the electronic zooming demand entry switch 20. The entry of an electronic zooming demand is visually indicated by means of a symbol in a view finder for verification. The electronic zooming demand maintains set even after turning off the electronic zooming demand entry switch 20 until turning on and off it again.

In this instance, part of the two-way optical zooming lever 19 outside the camera body 30, namely both ends 191a and 191b, are colored, for example, white and the acorn head 201a of the switch button 201 of the electronic zooming demand entry switch 20 is colored differently from the two-way optical zooming lever 19, for example, red.

As described above, since the camera 10 is provided with the electronic zooming demand entry switch 20 independently from the two-way optical zooming lever 19 and these switch and knob are colored differently, it is easy for the photographer to distinguish between them and, in consequence, to operate them without fail. Moreover, since the electronic zooming demand entry switch 20 is installed in the two-way optical zooming lever 19 with its switch button 201 projecting away from the surface of the two-way optical zooming lever 19, it is easy to distinguish between these two-way optical zooming lever 19 and demand entry switch 20 by feeling them with fingers, so that the photographer can easily and certainly operate them while seeing through the view finder, which enables the photographer to shoot photographs of desired objects without missing shutter chances.

Figure 12:
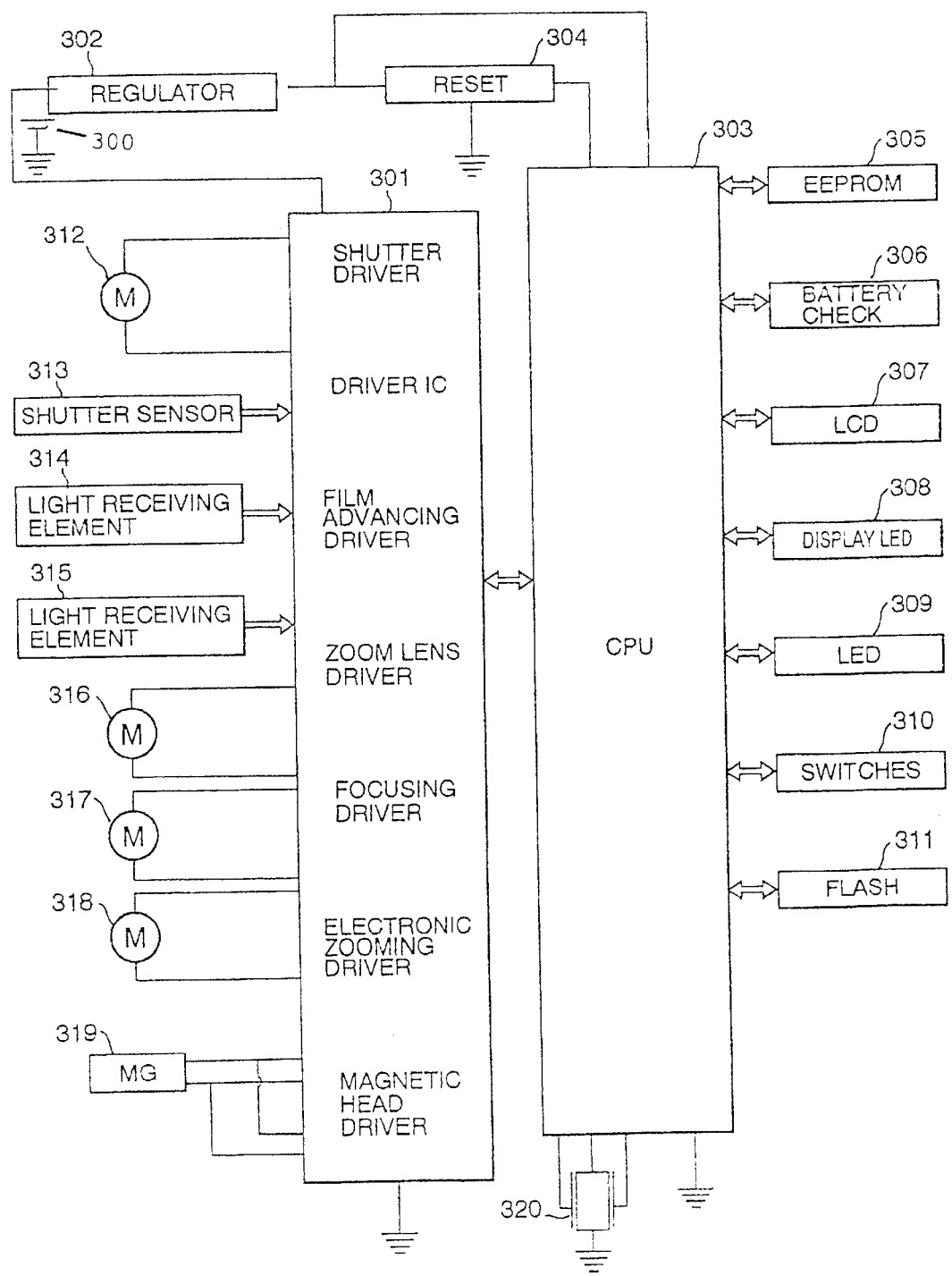
FIG. 12 is a block diagram showing a control circuit of the camera shown in FIGS. 1 through 3.

Referring to FIG. 12 which shows a control circuit of the camera 10 and in which some of elements shown in FIGS. 1 * 3 are omitted for simplicity, the control circuit is driven by a built-in power source battery 300. Electric power is supplied directly to a driver IC 301 and also supplied to CPU 303 after stabilization through a voltage regulator 302. A reset circuit 304, which monitors output voltage from the voltage regulator 302, brings CPU 303 to a halt in operation when it detects the output voltage form the voltage regulator 302 below a lower limit for normal operation of CPU 303 so as to prevent the camera 10 from running out of control. CPU 303 is connected to various elements such as EEPROM (electrically erasable/programmable read only memory) 305 in which programs that are executed in CPU 303 and data are loaded therein, a battery check circuit 306 for monitoring residual capacity of the built-in power source battery 300, an LCD (liquid crystal display device) 307 disposed in the view finder on which various information are displayed, various indicator LEDs (light emitting diodes) 308, an LED 309 forming a part of an automatic focusing (AF) system, a group of camera operating members 310 including the shutter button 16 (see FIG. 1), the print format designation switch 18 (see FIG. 2), the two-way optical zooming lever 19, the electronic zooming demand entry switch 20, etc., and an electronic flash circuit 311. The CPU receives command signals and information signals from some of these camera operating members 310 and controls the remaining camera operating members 310. A crystal oscillator 320 is connected to CPU 303 and generates a basic clock pulse which is essential for CPU 303 to operate. The driver IC 301, which is also connected to CPU 303, drives four electric motors, 312, 316, 317 and 318 and a magnetic recording head 319 (see FIG. 5) according to instruction or command signals from CPU 303. Connected to the driver IC 301 are a shutter sensor 313 operative to detect a timing at which the shutter starts to open, a light receiving element 314 which forms a part of an automatic exposure (AE) system and a light receiving element 315 which forms a part of the AF system.

The driver IC 301 includes a shutter driver operative to drive the electric motor 312 for driving the shutter. When the shutter driver receives a command signal from CPU 303, it actuates the electric motor 312 to open when the shutter sensor 313 detects opening of the shutter and maintains it actuated until a lapse of time that is determined on the basis of scene brightness detected by the AE light receiving element 314. This completes exposure of one frame. The driver IC 301 further includes drivers for driving the electric motor 316 for advancing a film strip loaded in the camera 10, driving the zoom lens barrel 11, and driving the electric motor 318 for actuating an automatic focusing (AF) mechanism, respectively. The film advancing motor driver actuates the film advancing motor 316 according to a command signal from CPU 303 to advance the film strip 100 by one frame out of the film cartridge 50 after every exposure and to wind it into the film cartridge 50 after exposure of the whole number of exposable frames. The zooming motor driver actuates the zooming motor 317 according to a command signal from CPU 303 which is provided in response to operation of the two-way optical zooming lever 19 to drive the zoom lens barrel 11 toward the telephoto end or toward the wide-angle end. The focusing motor driver actuates the focusing motor 318 according to a command signal from CPU 303 to focus the optical zoom lens so as to form a sharp image on the film. The driver IC 301 includes a magnetic recording head driver operative to actuate the magnetic recording head 319 when the electronic zooming demand entry switch 20 and/or the print format designation switch 18 are operated. The magnetic recording head driver actuates the magnetic recording head 319 when receiving a command signal from CPU 303 in response to operation of the electronic zooming demand entry switch 20 to record a magnetic information signal indicative of an electronic zooming demand on the magnetic information recording area 102 of an exposed frame 110 in synchronism with advancement of the exposed frame 110. In this instance, the magnetic information signal indicative of an electronic zooming demand is recorded only when the electronic zooming demand entry switch 20 remains on. It is indicated that no electronic zooming is demanded on an exposed frame 110 by no record of a magnetic information signal indicative of an electronic zooming demand on the magnetic information recording area 102 of the exposed frame 110. Further, the driver IC 301 includes another magnetic recording head driver operative to actuate the magnetic recording head 319 when receiving a command signal from CPU 303 min response to operation of the print format designation switch 18 to record a magnetic information signal indicative of a desired print format, "C", "H" or "P" print format, on the magnetic information recording area 102 of an exposed frame 110 in synchronism with advancement of the exposed frame 110. These command signals indicative of print format and electronic zooming are used during making prints from the developed negative film strip 100. These drivers may be integrated as one driver operative to actuate the magnetic recording head 319 both when receiving a command signal indicative of operation of the print format designation switch 18 and when receiving a command signal indicative of operation of the electronic zooming demand entry switch 20.

Figure 13:
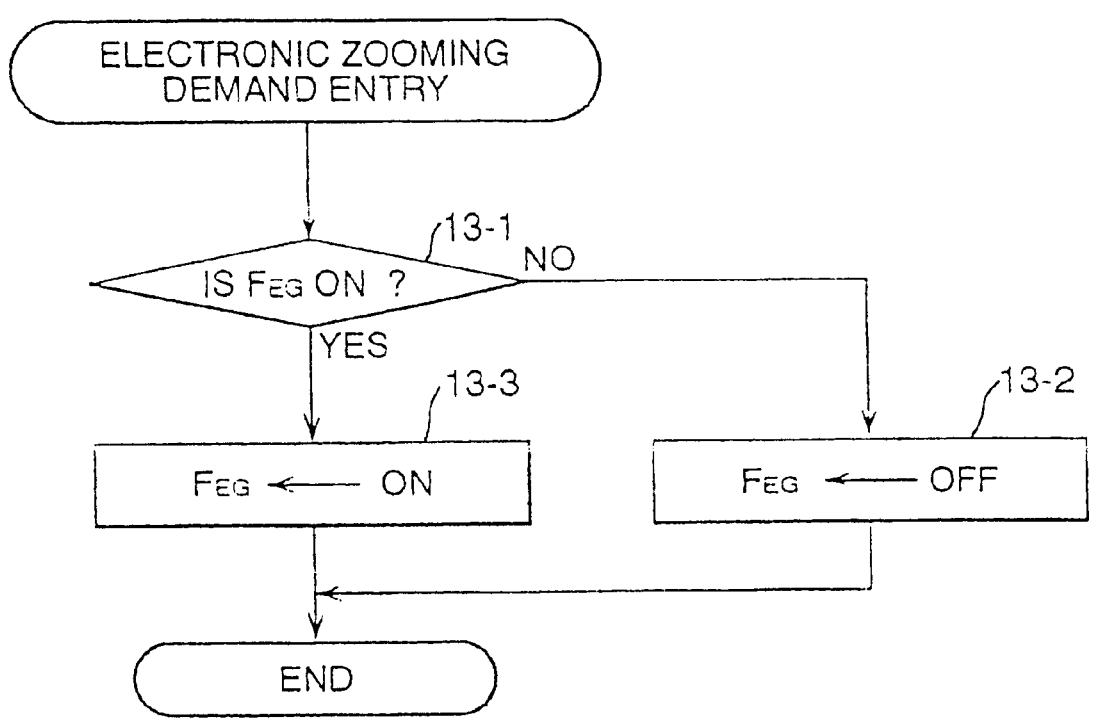
FIG. 13 is a flow chart illustrating a sequence routine of an electronic zooming demand entry.

FIG. 13 shows a flow chart illustrating a sequence routine of electronic zooming demand entry which is performed in CPU 303. In CPU 303 there is prepared an electronic zooming flag FEG which is set on when the electronic zooming demand entry switch 20 is turned on once and set off when it is subsequently turned on again. As shown, whenever the electronic zooming demand entry switch 20 is pushed, the sequence logic starts to make a decision at step 13-1 as to whether the electronic zooming flag FEG is on. When the answer to the decision is negative, this indicates that the electronic zooming demand entry switch 20 has been not previously turned on, then, after setting on the electronic zooming flag FEG so as to indicate that the electronic zooming is demand at step 13-2, the sequence logic terminates. On the other hand, when the answer to the decision is affirmative, this indicates that the electronic zooming demand entry switch 20 has been previously turned on, then, after setting off the electronic zooming flag FEG so as to indicate withdrawal of the demand of electronic zooming at step 13-3, the sequence logic terminates. That is to say, the electronic zooming flag FEG is set on or off whenever the electronic zooming demand entry switch 20 is turned on once.

Figure 14:
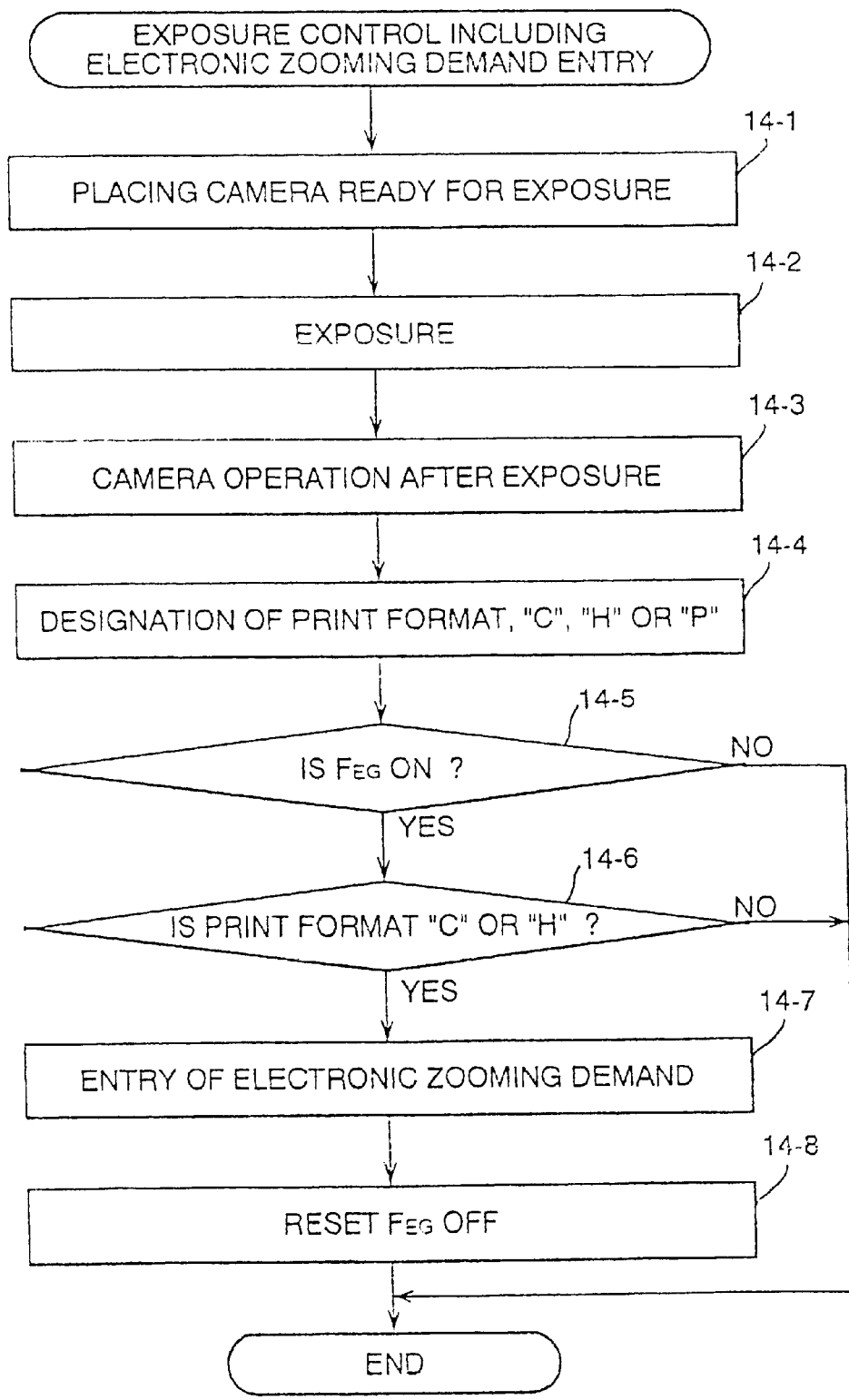
FIG. 14 is a flow chart illustrating a sequence routine of exposure control including an electronic zooming demand entry.

FIG. 14 is a flow chart illustrating a sequence routine of control of recording an electronic zooming demand which is performed following operation of the shutter button 16. When the shutter button 16 is pushed down, the sequence logic commences and control proceeds to a function block at step 14-1 where the camera 10 is placed ready for exposure by metering brightness of an object to be photographed for automatic exposure, automatically ranging a distance to the object and adjusting the optical zoom lens at the object distance, etc. Subsequently, the shutter is opened and closed to make exposure in synchronism with firing the electronic flash if necessary at step 14-2. After the exposure, necessary camera operation such as, for example, advancing the film strip 100 by one frame and counting up an exposure counter are made at step 14-3. During the advancement of the film strip 100 after exposure, the entry of an electronic zooming demand is controlled through steps 14-4 through 14-8. Specifically, the magnetic recording head driver in the driver IC 301 actuates the magnetic recording head 319 to record magnetic information indicative of a desired print format, "C", "H" or "P" print format, on the magnetic information recording area 102 of an exposed frame 110 at step 14-4. Subsequently, a decision is made at step 14-5 as to whether the electronic zooming flag FEG is on. When the answer to the decision is negative, this indicates that there is no demand for electronic zooming in a printing process, then, the sequence logic terminates. On the other hand, when the answer to the decision is affirmative, this indicates that there is a demand for electronic zooming in a printing process, then, another decision is made at step 14-6 as to whether a designation of print format is directed to the "P" print format or others, namely the "C" print format and the "H" print format. The reason for making the decision is that there is a possibility that the print format designation switch 18 is operated to designate the "P" print format after operation of the electronic zooming demand entry switch 20 and, in such a case, it is necessary to prevent electronic zooming demand from being entered even while the electronic zooming flag FEG is on. When the "P" print format is designated, the sequence logic terminates. It is preferable to indicate withdrawal of an electronic zooming demand in the view finder before the sequence logic terminates. When a designation of print format is directed to the "C" print format or the "H" print format, the magnetic recording head driver in the driver IC 301 actuates the magnetic recording head 319 to record magnetic information indicative of the entry of an electronic zooming demand on the magnetic information recording area 102 of the exposed frame 110 at step 14-7. Finally, after setting on the electronic zooming flag FEG at step 14-8, the sequence logic terminates. In this embodiment, an entry of an electronic zooming demand is valid for a single exposure frame and made after completion of exposure of the previous exposure frame. This single frame electronic zooming demand entry is achieved through setting on the electronic zooming flag FEG prior to exposure of a following exposure frame. As above, magnetic information signals indicative of print format and electronic zooming demand are recorded on the magnetic recording area of each exposure frame 110 of the film strip 100. However, whenever the "P" print format is designated, an entry of an electronic zooming demand is disregarded.

When the maximum number of exposures available on the film strip 100 are exposed, the driver IC 301 actuates the film advancing motor 316 so as to rewind the film strip 100 into the film cartridge 50 completely. The film cartridge 50 with the exposed film strip 100 is removed from the camera and given to a photofinisher for developing the exposure film strip 100 and making prints from the developed negative film strip 100. The magnetic information signals recorded on the magnetic information recording area 102 are read by a printing machine and used during making prints from the developed film strip 100.

In the above embodiment the entry of an electronic zooming demand provides a single print magnification, such as, ×1.7. However, it is possible to enter multi electronic zooming demands for print magnifications, such as, ×1.5 and ×2.0. In such a case, if employing the switch mechanism of the electronic zooming demand entry switch 20 just as it is, the electronic zooming demand entry switch 20 is designed and adapted to make a circulation of entries of electronic zooming demands for magnifications ×1.5 and ×2.0 and withdrawal of the entry of the electronic zooming demand. Specifically, the electronic zooming demand entry switch 20 makes an entry of the electronic zooming demand for ×1.5 at first operation, an entry of the electronic zooming demand for ×2.0 at second operation, and withdrawal of the entry of the electronic zooming demand at third operation. As apparent, the electronic zooming demand entry switch 20 makes an entry of the electronic zooming demand for ×1.5 again at fourth operation.

Figure 15:
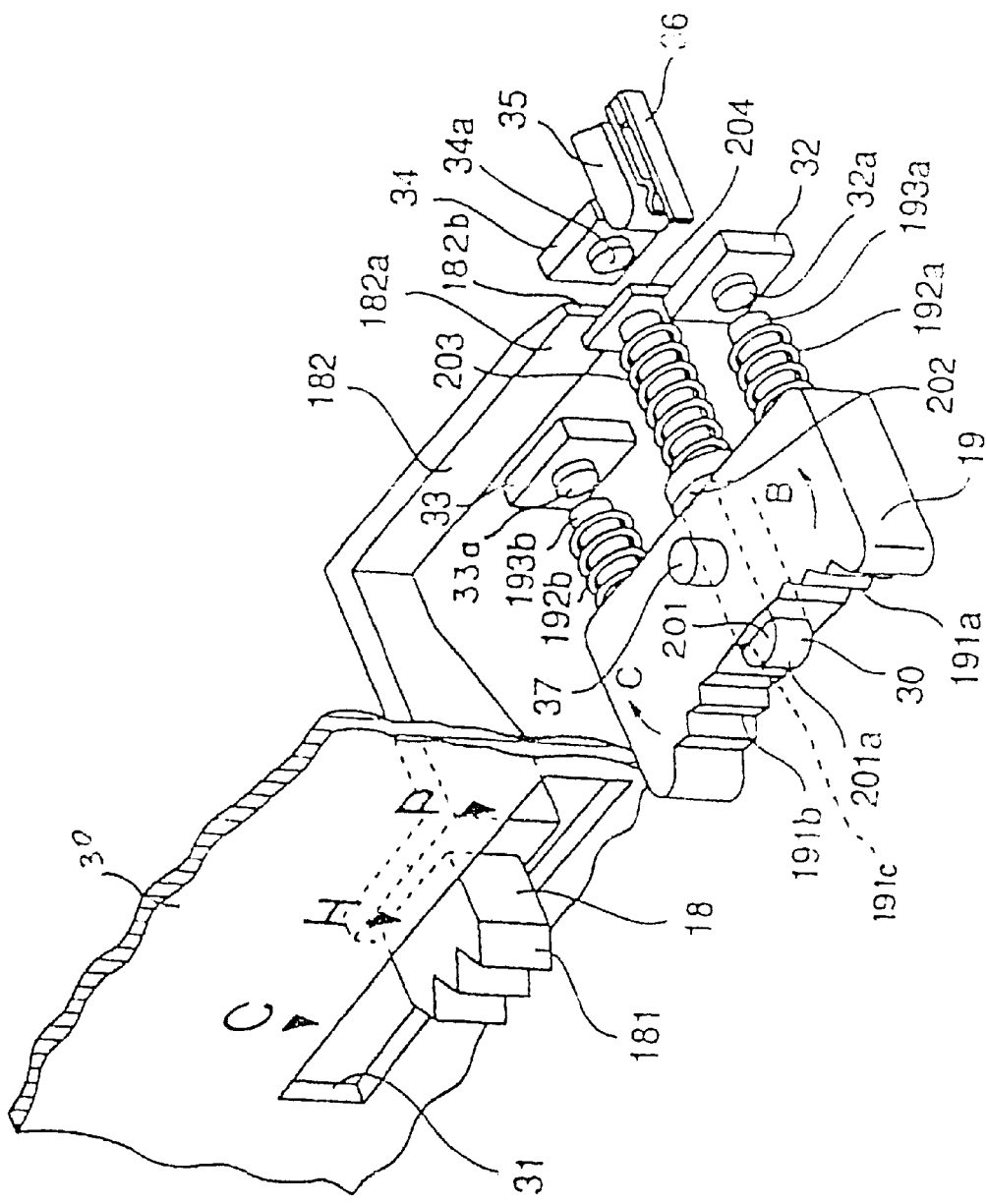
FIGS. 15 and 16 are perspective views of a switch mechanism for optical zooming, electronic zooming demand entry and print format designation incorporated in the camera shown in FIGS. 1 through 3.
Figure 16:
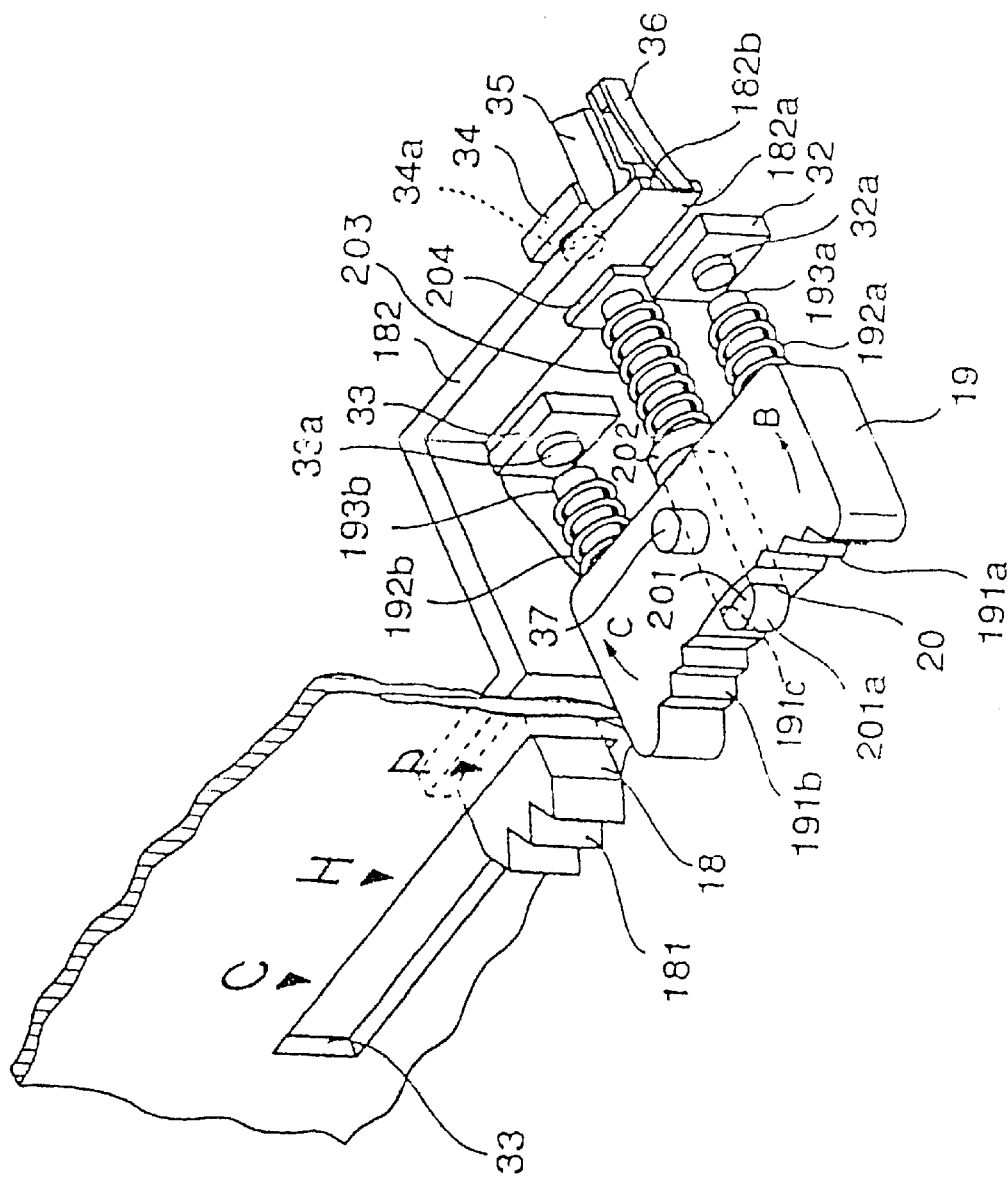
Figure 17:
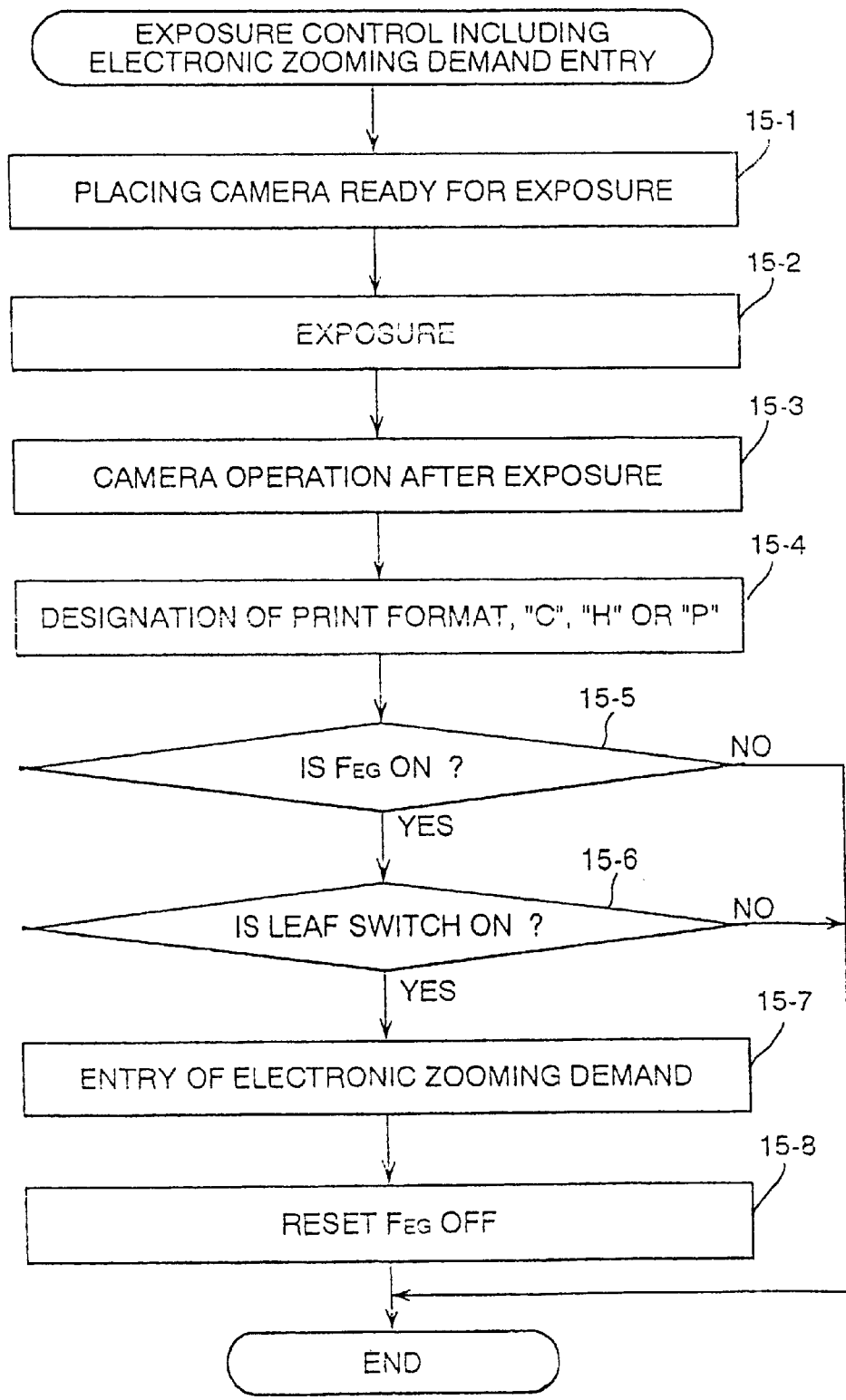
FIG. 17 is a flow chart illustrating a sequence routine of exposure control including an electronic zooming demand entry.

A camera in accordance with another embodiment of the invention is shown in FIGS. 15 through 17. The camera is basically the same in structure as the camera according to the previous embodiment shown in FIGS. 1, 2, 3, 5, 12 and 13 excepting a print format designation switch 18 in combination with an electronic zooming demand entry switch 20.

Referring to FIGS. 15 and 16 showing the print format designation switch 18 and the electronic zooming demand entry switch 20, the a print format designation switch 18, which takes a form of a slide switch, has a knob 181 projecting through a guide slot 31 formed in a rear wall of a camera body 30. The knob 181 has an generally L-shaped lock lever 182 which is secured to the knob 181 and extends in the inside of the camera 10. The knob 181 is movable to select three positions assigned to the "C" print format, the "H" print format and the "P" print format, respectively. When each print format position is selected to designate a desired print format for an exposure frame 110, the magnetic recording head 319 (see FIG. 5) magnetically records magnetic information indicative of designation of a desired print format on the magnetic information recording area 102.The two-way optical zooming lever 19 is pivoted for rotation on a pivot shaft 37 secured to the camera body 30. Pushing the two-way optical zooming lever 19 at one of opposite ends 191a and 191b, for instance the end 191a, causes the two-way optical zooming lever 19 to turn in a counterclockwise direction B as viewed in the figure, so as to force a contact rod 193b against a coil spring 192a to come into contact with a switch contact 32a of a tact switch 32. While the switch contact 32a of the tact switch 32 remains contacted by the contact rod 193b, the zoom lens barrel 11 is driven to shift the optical zoom lens toward a telephoto end. Releasing the two-way optical zooming lever 19, the rod contact 193b is forced back by the coil spring 192a to return into its neutral position for disconnection from the switch contact 32a of the tact switch 32. Similarly, pushing the two-way optical zooming lever 19 at another end 191b causes the two-way optical zooming lever 19 to turn in a clockwise direction C as viewed in the figure to force a contact rod 193b against a coil spring 192b to come into contact with a switch contact 33b of a tact switch 33. While the switch contact 33b of the tact switch 33 remains contacted by the contact rod 193b, the zoom lens barrel 11 is driven to shift the optical zoom lens toward a wide-angle end. Releasing the two-way optical zooming lever 19, the rod contact 193b is forced back by the coil spring 192b to return into its neutral position for disconnection from the switch contact 33b of the tact switch 33. The two-way optical zooming lever 19 at its center is formed with a bore 191c in which a switch button 201 in a form of a push rod is inserted such that it is prevented from slipping off by a stopper ring 202. An acorn head 201a of the switch button 201 projects away from the surface of the two-way optical zooming lever 19. As shown in FIG. 15, when pushing the electronic zooming demand entry switch 20 at the switch button 201 against a coil spring 203 while the print format designation switch 18 selects the "C" print format position or the "H" print format position, the switch contact 204 at the top of the switch button 201 is brought into contact with a switch contact 34a of a tact switch 34, causing the magnetic recording head 319 to magnetically record magnetic information indicative of designation of the print format, the "C" print format or the "H" print format on the magnetic information recording area 102. Releasing the switch button 201, the switch button 201 is forced back by the coil spring 203 to return into its neutral position, turning off the electronic zooming demand entry switch 20. Setting an electronic zooming demand is visually verified by means of a symbol shown in a view finder. The electronic zooming demand maintains set even after turning off the electronic zooming demand entry switch 20 until turning on it again.

On the other hand, as shown in FIG. 16, when the print format designation switch 18 is in the "P" print format position, the generally L-shaped block lever 182 at its distal end 182a runs into between the switch contact 204 at the top of the switch button 201 and the tact switch 34, and then rides onto a stationary block 35. As a result, the switch contact 204 at the top of the switch button 201 is prevented from being brought into contact with the switch contact 34a of the tact switch 34 even when the electronic zooming demand entry switch 20 is operated. In the "P" print format position, the L-shaped block lever 182 at its end jaw 182b is brought into contact with a contact of a leaf switch 36 to open or turn off the leaf switch 36. By means of this, when an electronic zooming demand has been entered prior to designation of the "P" print format, the leaf switch 36 that has been opened prevents an enter of an electronic zooming demand. In the case where the "P" print format is designated once after an entry of an electronic zooming demand, the electronic zooming is effectively performed only when an exposure is made after designation of the "C" or the "H" print format. Similarly to the camera 10 in accordance with the previous embodiment, since the camera 10 is provided with the electronic zooming demand entry switch 20 independently from the two-way optical zooming lever 19 and these switch and knob are colored differently, it is easy for the photographer to distinguish between them and, in consequence, to operate them without fail due to confusions. Moreover, since the electronic zooming demand entry switch 20 is installed in the two-way optical zooming lever 19 with its switch button 201 projecting away from the surface of the two-way optical zooming lever 19, it is easy to distinguish between these two-way optical zooming lever 19 and demand entry switch 20 by feeling them with fingers, so that the photographer can easily and certainly operate them while seeing through the view finder, which enables the photographer to shoot photographs of desired objects without missing shutter chances.

The camera 10 has the same control circuit as that shown in FIG. 12 and performs an electronic zooming demand entry following a sequence routine shown by a flow chart in FIG. 13.

FIG. 17 is a flow chart illustrating a sequence routine of controlling an entry of electronic zooming demand. When the shutter button 16 is pushed down, the sequence logic commences and control proceeds to a function block at step 15-1 where the camera 10 is placed ready for exposure by metering brightness of an object to be photographed for automatic exposure, automatically ranging a distance to the object and adjusting the zoom lens at the object distance, etc. Subsequently, the shutter is opened and closed to make exposure in synchronism with firing the electronic flash if necessary at step 15-2. After the exposure, necessary camera operation such as, for example, advancing the film strip 100 by one frame and counting up an exposure counter are made at step 15-3. During the advancement of the film strip 100 after exposure, an entry of an electronic zooming demand is controlled through steps 154 through 15-8. Specifically, the magnetic recording head driver in the driver IC 301 (see FIG. 12) actuates the magnetic recording head 319 to record magnetic information indicative of the designation of the "C" print format, the "H" print format, or the "P" print format on the magnetic information recording area 102 of an exposed frame 110 at step 154. Subsequently, a decision is made at step 15-5 as to whether the electronic zooming flag F$_{EG}$ is on. When there is no electronic zooming demand, then, the sequence logic terminates. On the other hand, when there is an electronic zooming demand, then, another decision is made at step 15-6 as to whether the leaf switch 36 remains turned on. This is because that, as described in connection with the previous embodiment, there is a possibility that the print format designation switch 18 is operated to designate the "P" print format after operation of the electronic zooming demand entry switch 20 and, in such a case, it is necessary to prevent an entry of the electronic zooming demand even while the electronic zooming flag F$_{EG}$ is on. When the leaf switch 36 is off, the sequence logic terminates. It is preferable to show a sign of withdrawal of an electronic zooming demand in the view finder before the sequence logic terminates. When the leaf switch 36 remains turned on, this indicates that the desired print format is directed to the "C" print format or the "H" print format, then, the magnetic recording head driver in the driver IC 301 actuates the magnetic recording head 319 to record magnetic information indicative of the entry of an electronic zooming demand on the magnetic information recording area 102 of the exposed frame 110 at step 15-7. Absence of a magnetic information signal on the magnetic information recording area 102 of the exposed flame 110 represents that there is no electronic zooming demand for the exposed frame 110. Finally, after setting off the electronic zooming flag F$_{EG}$ at step 15-8, the sequence logic terminates.

As described above, because the electronic zooming flag F$_{EG}$ is reset off at step 15-8 prior to exposure for the following exposure frame 110, the entry of an electronic zooming demand is effective only for an exposure frame that is intended to be exposed. Accordingly, whenever it is intended to enter an electronic zooming demand for the following exposure frame 110, the electronic zooming demand entry switch 20 must be operated to enter an electronic zooming demand for the following exposure frame before exposure. The entry of an electronic zooming demand is always effected simultaneously with designation of desired print formats excepting the "P" print format. When the maximum number of exposures available on the film strip 100 are exposed, the driver IC 301 actuates the film advancing motor 316 so as to rewind the film strip 100 into the film cartridge 50 completely. The film cartridge 50 with the exposed film strip 100 is removed from the camera 10 and given to a photofinisher for developing the exposure film strip 100 and making prints from the developed negative film strip 100 according to the electronic zooming demands in designated print formats.

Figure 18:
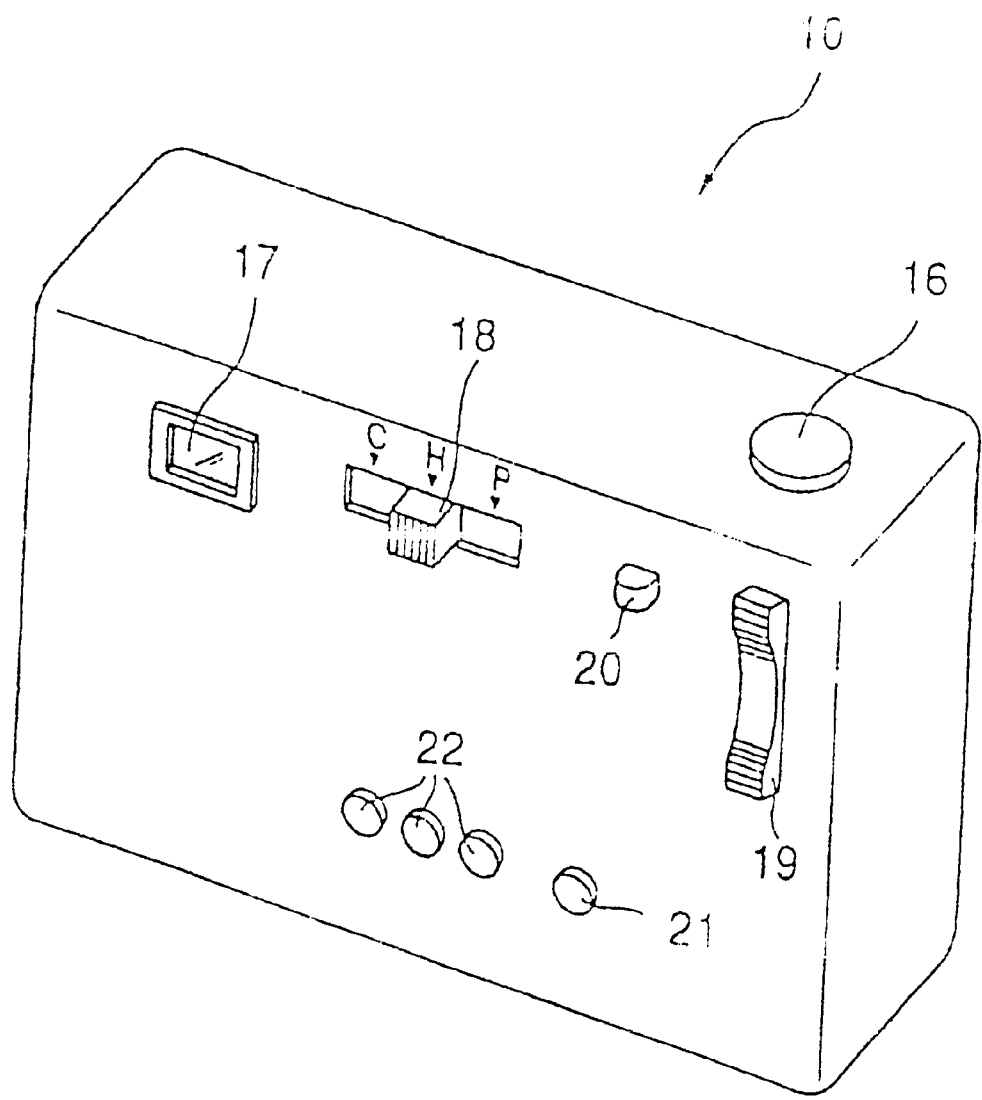
FIG. 18 is a perspective front view of a camera in accordance with another embodiment of the invention.
Figure 19:
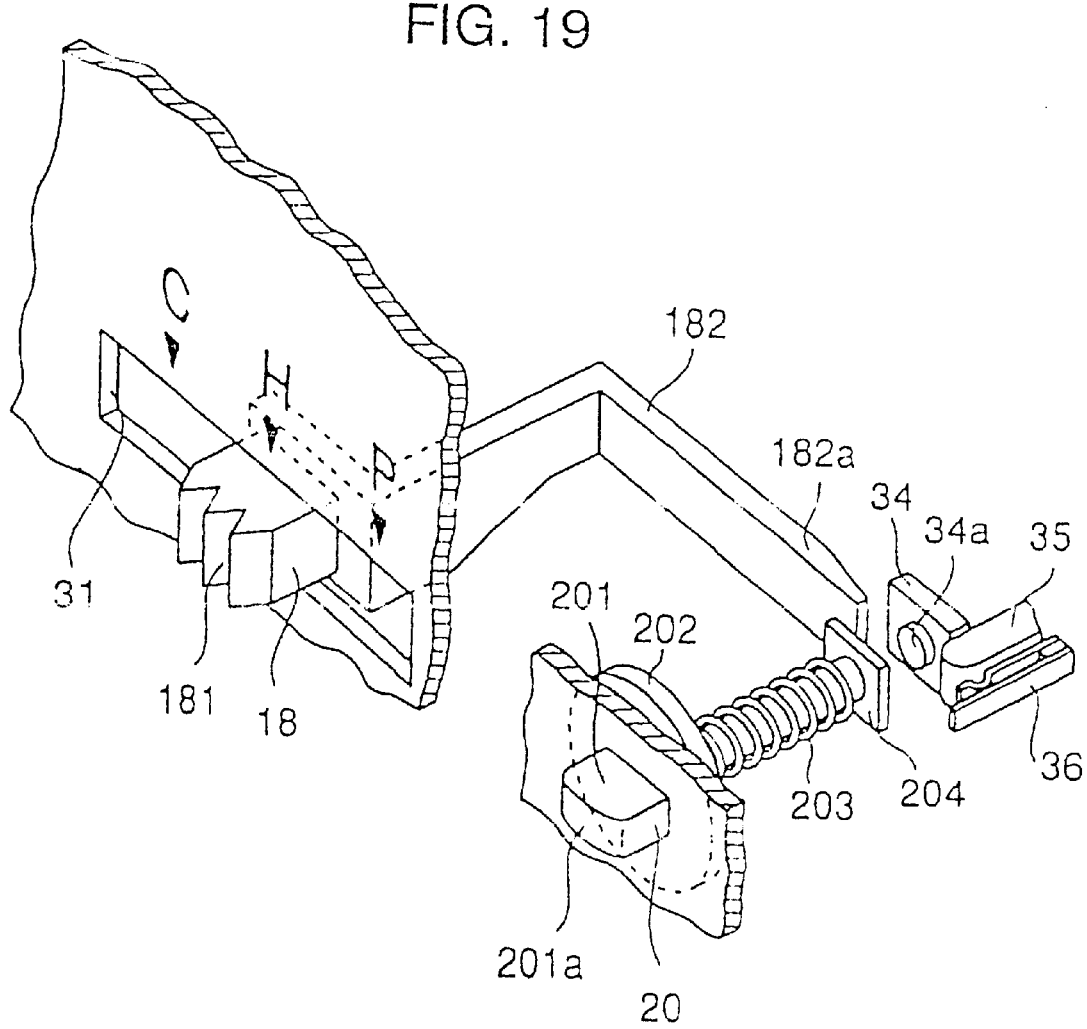
FIGS. 19 and 20 are perspective views of a switch mechanism for optical zooming and an electronic zooming demand entry incorporated in the camera of FIG. 18.
Figure 20:
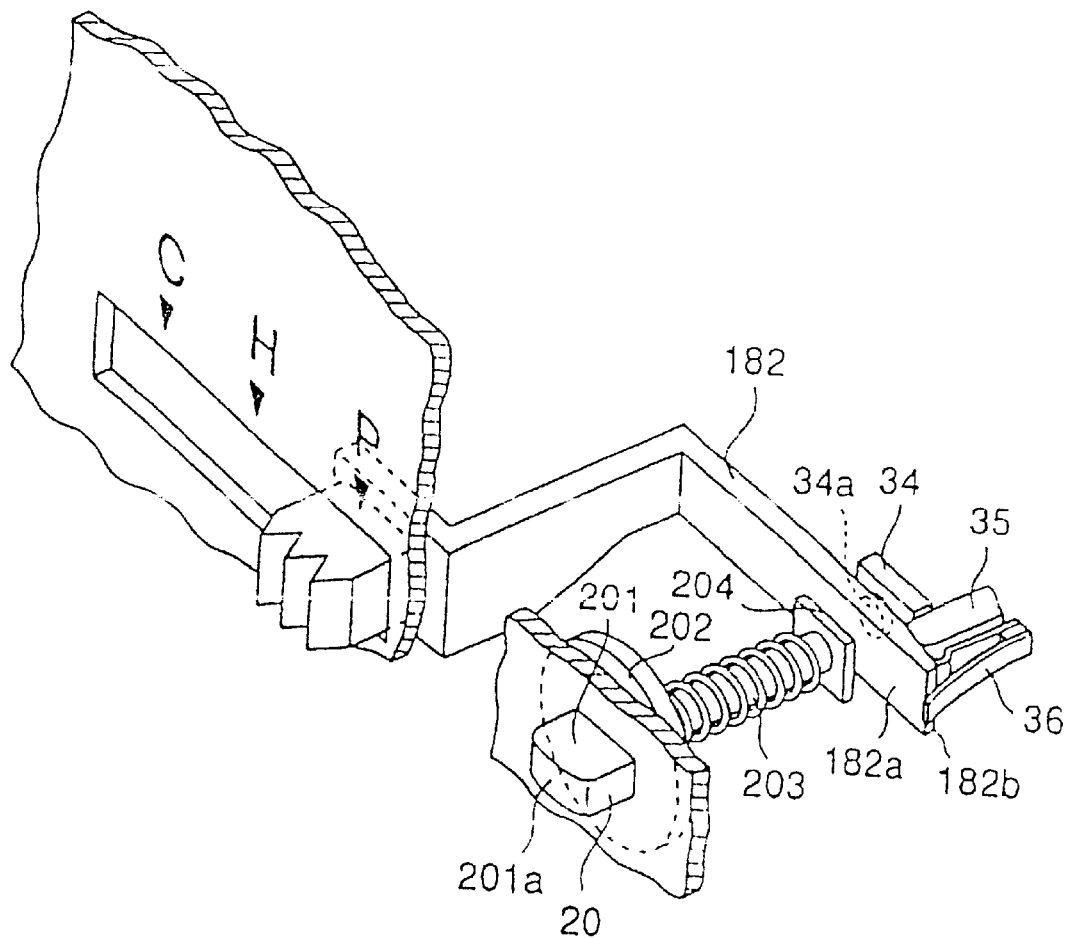

FIGS. 18 through 20 show a camera which is basically the same in structure and operation as the camera according to the previous embodiment shown in FIGS. 1, 2, 3, 5, 15 and 16. A difference is only that an electronic zooming demand entry switch 20 and a two-way optical zooming lever 19 are installed to the camera 10 separately from each other and are the same in structure and operation as those shown in FIG. 15 and 16, respectively. Specifically, the electronic zooming demand entry switch 20 is in a specified position relative to a print format designation switch 18 such that the electronic zooming demand entry switch 20 is allowed to turn and enter an electronic zooming demand while the print format designation switch 18 is in the "C" print format position or the "H" print format position and is prevented from turning and entering an electronic zooming demand by the block lever 182 while in the "P" print position which is accompanied by turning off a leaf switch 36.

The camera 10 shown in FIGS. 18 through 20 has the same control circuit as that shown in FIG. 12 and performs exposure control including electronic zooming demand entry following a sequence routine shown by a flow chart in FIGS. 13 and 17.

The switch mechanism comprising the print format designation switch 18 and the electronic zooming demand entry switch 20 is suitably applied to a camera which has an ordinary taking lens with an invariable focal length, and hence no zooming lever.

Figure 21:
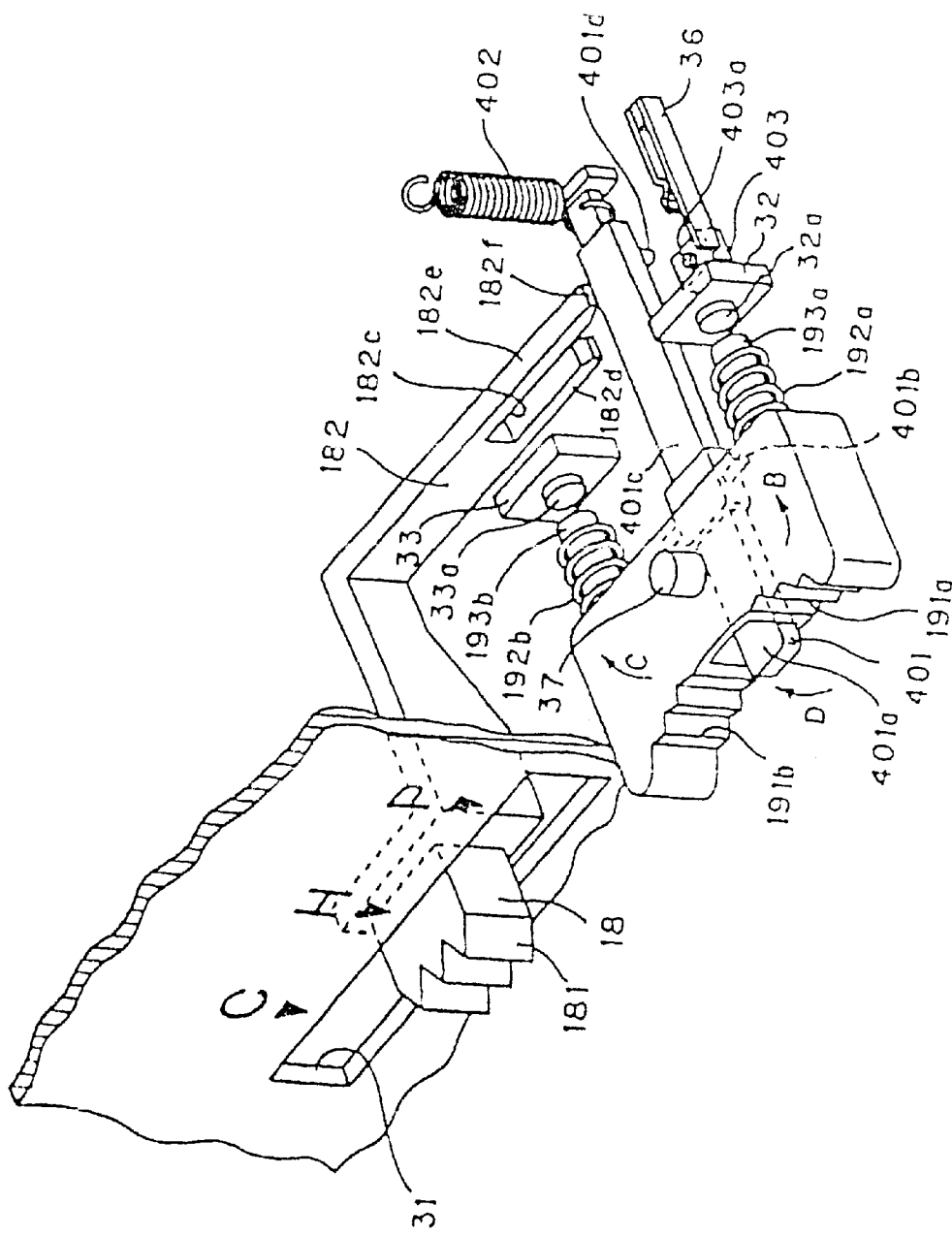
FIGS. 21 and 22 are perspective views of another switch mechanism for optical zooming and an electronic zooming demand entry incorporated in the camera of FIGS. 1 through 3.
Figure 22:
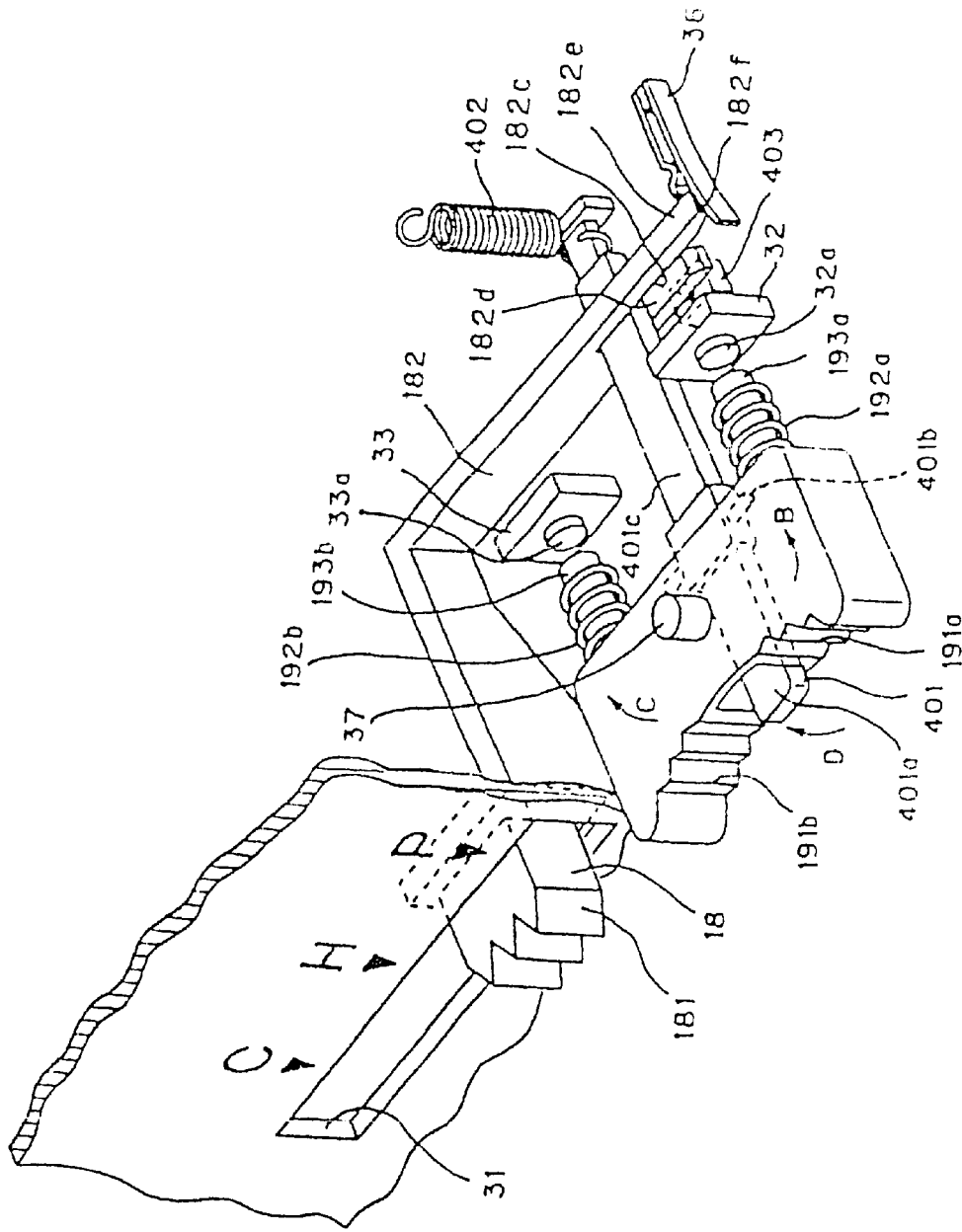

FIGS. 21 and 22 show another variation of the switch mechanism for zooming, an entry of electronic zooming demand and designation of print formats shown in FIGS. 15 and 16. As shown an electronic zooming demand entry member 401 having a form of a slide lever is installed in place of the electronic zooming demand entry switch 20. The electronic zooming demand entry member 401 having an arm 401c is pivoted on the camera body by a pivot shaft 401b extending in a direction spatially perpendicular to an optical axis of the zoom lens so as to turn up and down about the pivot shaft 401b. When the electronic zooming demand entry member 401 at its external end 401a is pushed up in a direction indicated by an arrow D against a spring 402, the electronic zooming demand entry member 401 at its inner end brings a contact button 401d into contact with a switch contact 403b of a tact switch 403 so as to provide a signal for causing an information recording device to record information indicating an entry of an electronic zooming demand on the film 100 or canceling the entry of an electronic zooming demand in the same manner as previously described. When releasing the electronic zooming demand entry member 401, it is turned to its initial position shown in FIG. 21 to separate the contact button 401d from the switch contact 403b of the tact switch 403. The entry of an electronic zooming demand through the electronic zooming demand entry member 401 is permitted while the print format designation switch 18 is in the "C" print format position or the "H" print format position. However, the entry of an electronic zooming demand through the electronic zooming demand entry member 401 is prevented while the print format designation switch 18 is in the "P" print format position as will be described below.

The print format designation switch 18 has an L-shaped block lever 182 formed with a forked end 182c consisting an upper arm 182e and a lower arm 182d. When the print format designation switch 18 is moved into the "P" print format position as shown in FIG. 22, the block lever 182 brings the forked end 182c into engagement with the arm 401c of the electronic zooming demand entry member 401 so as to prevent the electronic zooming demand entry member 401 from turning in the direction indicated by the arrow D, thereby blocking turning on the tact switch 403. In addition, the movement of the print format designation switch 18 into the "P" print format position is accompanied by opening a leaf switch 36 with the same effect as described in the previous embodiment.

Figure 23:
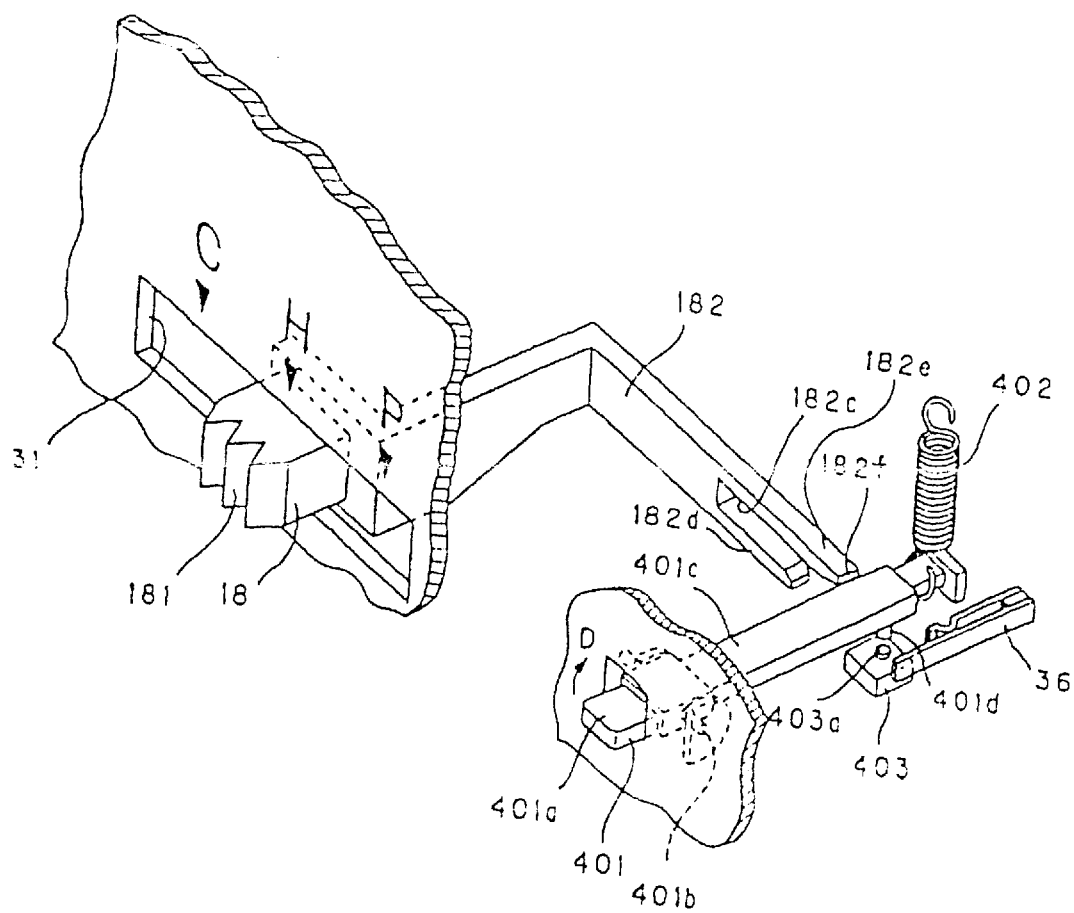
FIGS. 23 and 24 are perspective views of another switch mechanism for optical zooming and an electronic zooming demand entry incorporated in the camera of FIGS. 1 through 3.
Figure 24:
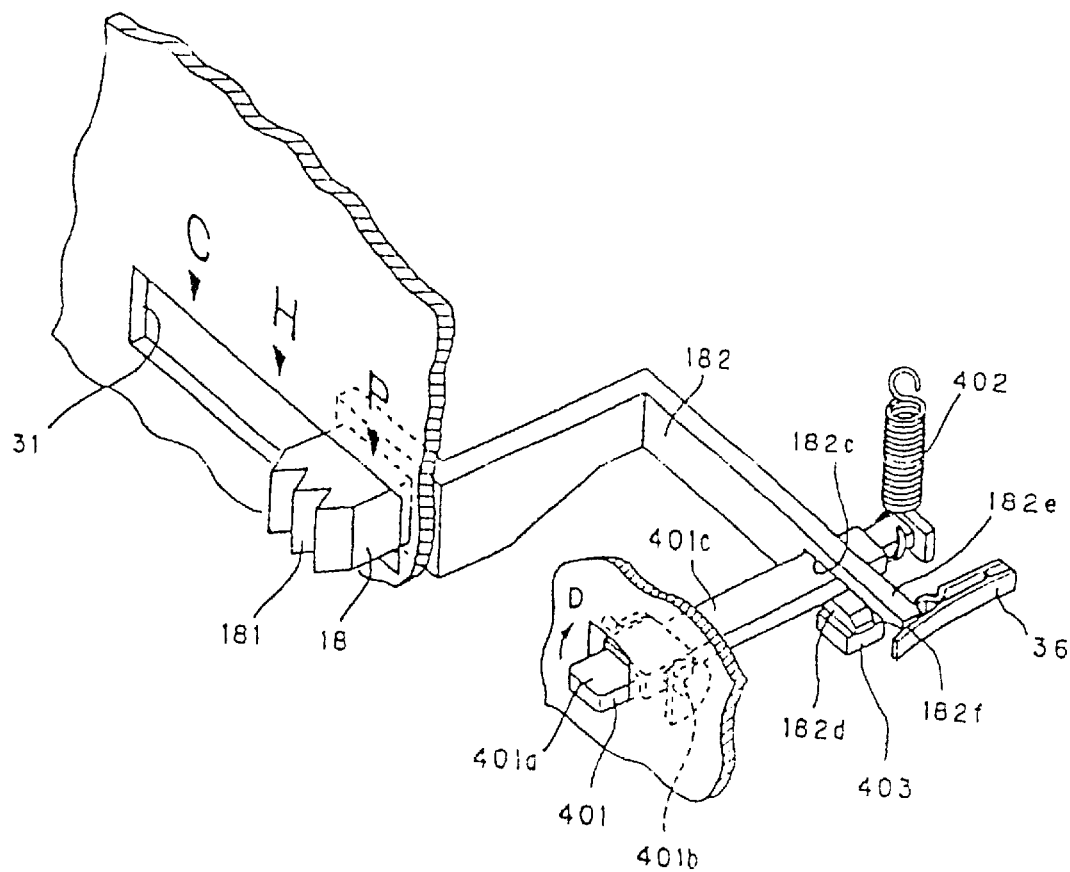

FIGS. 23 through 24 show a variation of the switch mechanism for an entry of electronic zooming demand and designation of print formats shown in FIGS. 21 and 22. A difference is only that an electronic zooming demand entry switch 401 and a zooming lever (not shown) are installed to the camera 10 separately from each other and are the same in structure and operation as those shown in FIGS. 21 and 22, respectively. Specifically, the electronic zooming demand entry switch 401 is in a specified position relative to a print format designation switch 18 such that the electronic zooming demand entry switch 401 is allowed to turn and enter an electronic zooming demand while the print format designation switch 18 is in the "C" print format position or the "H" print format position and is prevented from turning and entering an electronic zooming demand by the block lever 182 while in the "P" print position. At this time, movement of the print format designation switch 18 into the "P" print format position brings the block lever 182 into abutment on a leaf switch 36 to turn off.

The switch mechanism may be installed in a camera equipped with an optical lens having an invariable focal length or may be installed in a camera equipped with an optical zoom lens in combination with an optical zooming member for changing a zoom ratio or a focal length of the optical zoom lens, continuously or in steps.

In the above embodiments the entry of an electronic zooming demand provides a single print magnification, such as, ×1.7. However, it is possible to provide multi electronic zooming demand for print magnifications, such as, ×1.5 and ×2.0. In such a case, if employing the switch mechanism of electronic zooming demand entry switch 401 just as it is, the electronic zooming demand entry switch 401 is designed and adapted to make a circulation of entries of the electronic zooming demands for print magnifications ×1.5 and ×2.0 and withdrawal of the entry of the electronic zooming demand. Specifically, the electronic zooming demand entry switch 401 makes an entry of the electronic zooming demand for a print magnification ×1.5 at first operation, an entry of the electronic zooming demand for a print magnification ×2.0 at second operation, and withdrawal of the entry of the electronic zooming demand at third operation. As apparent, the electronic zooming demand entry switch 401 makes an entry of the electronic zooming demand for the print magnification again at fourth operation. In both case where a single electronic zooming demand entry is provided and case where multi electronic zooming demand entry is allowed, the print format designation switch 18 may be of a push button type designation switch is designed and adapted to make a circulation of designation of the "C" print format, the "H" print format and the "P" print format in this order and to lock the electronic zooming demand entry switch 401, for example, electromagnetically, so as to disable the electronic zooming entry switch from operating while it is in the "P" print format position. Further in the above embodiments the electronic zooming demand entering switch may be of any type that mechanical action of the electronic zooming demand entering switch is either prohibited or allowed while the print format designation switch 18 is in the "P" position.

Figure 25:
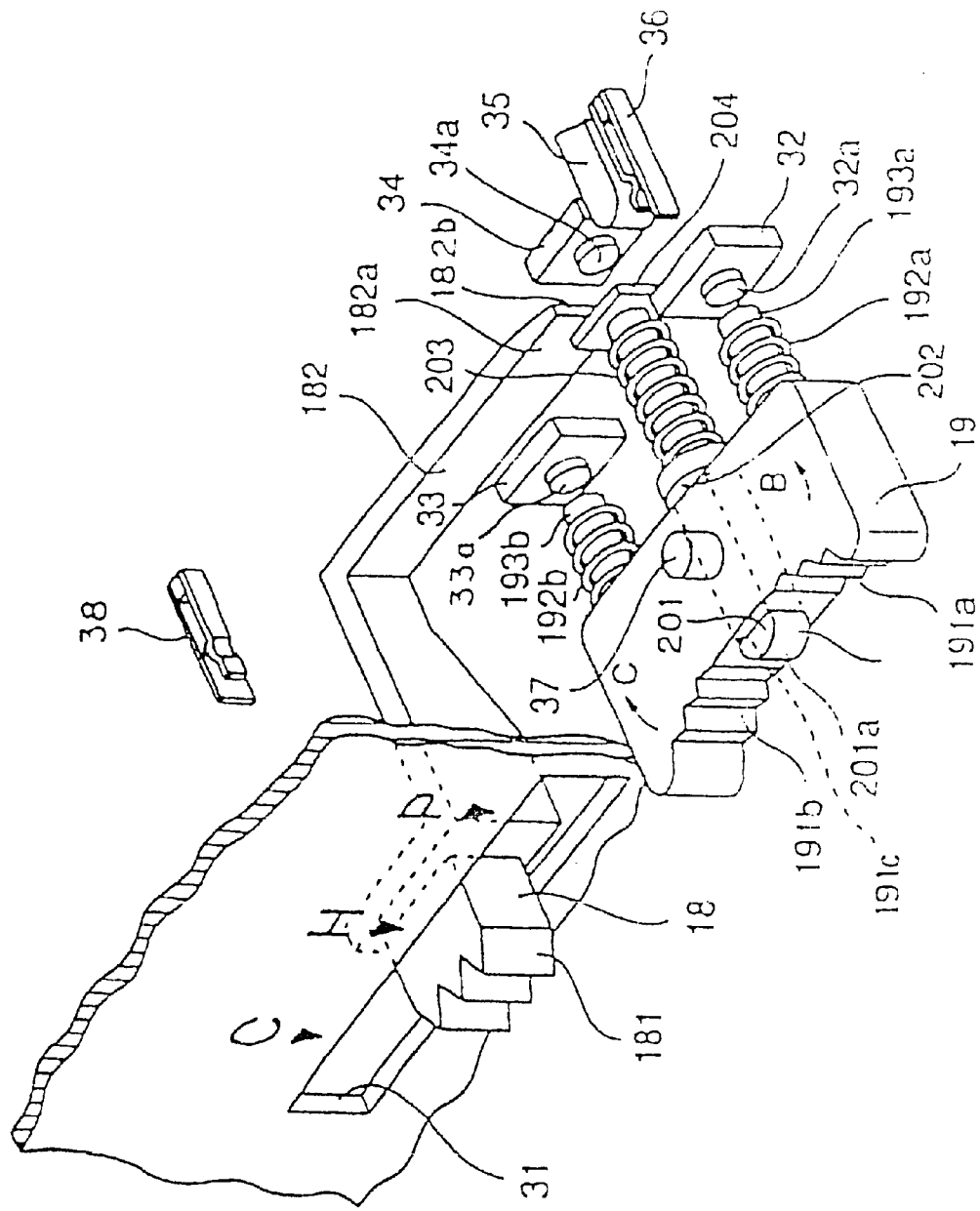
FIGS. 25 through 27 are perspective views of another switch mechanism for optical zooming and an electronic zooming demand entry incorporated in the camera of FIGS. 1 through 3.
Figure 26:
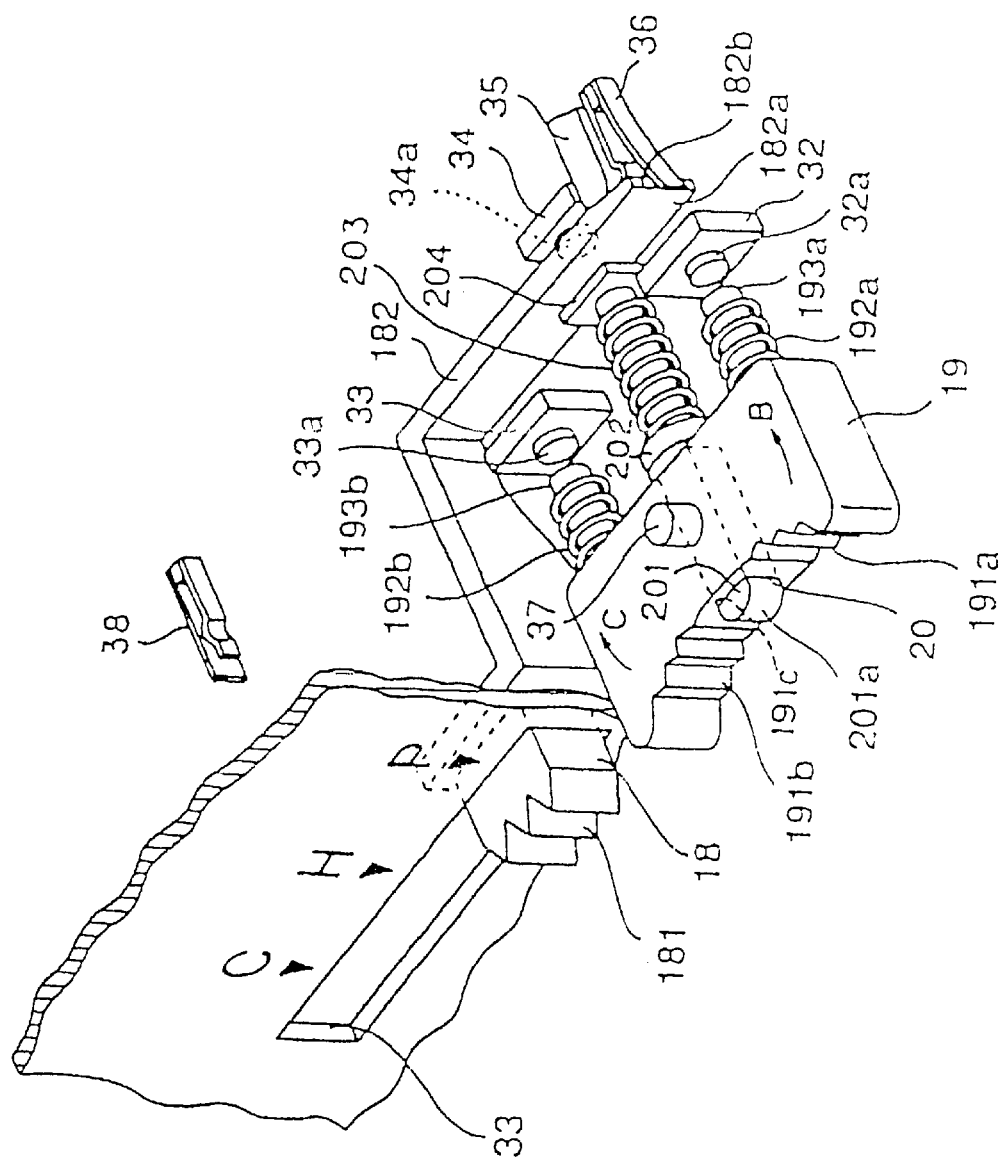
Figure 27:
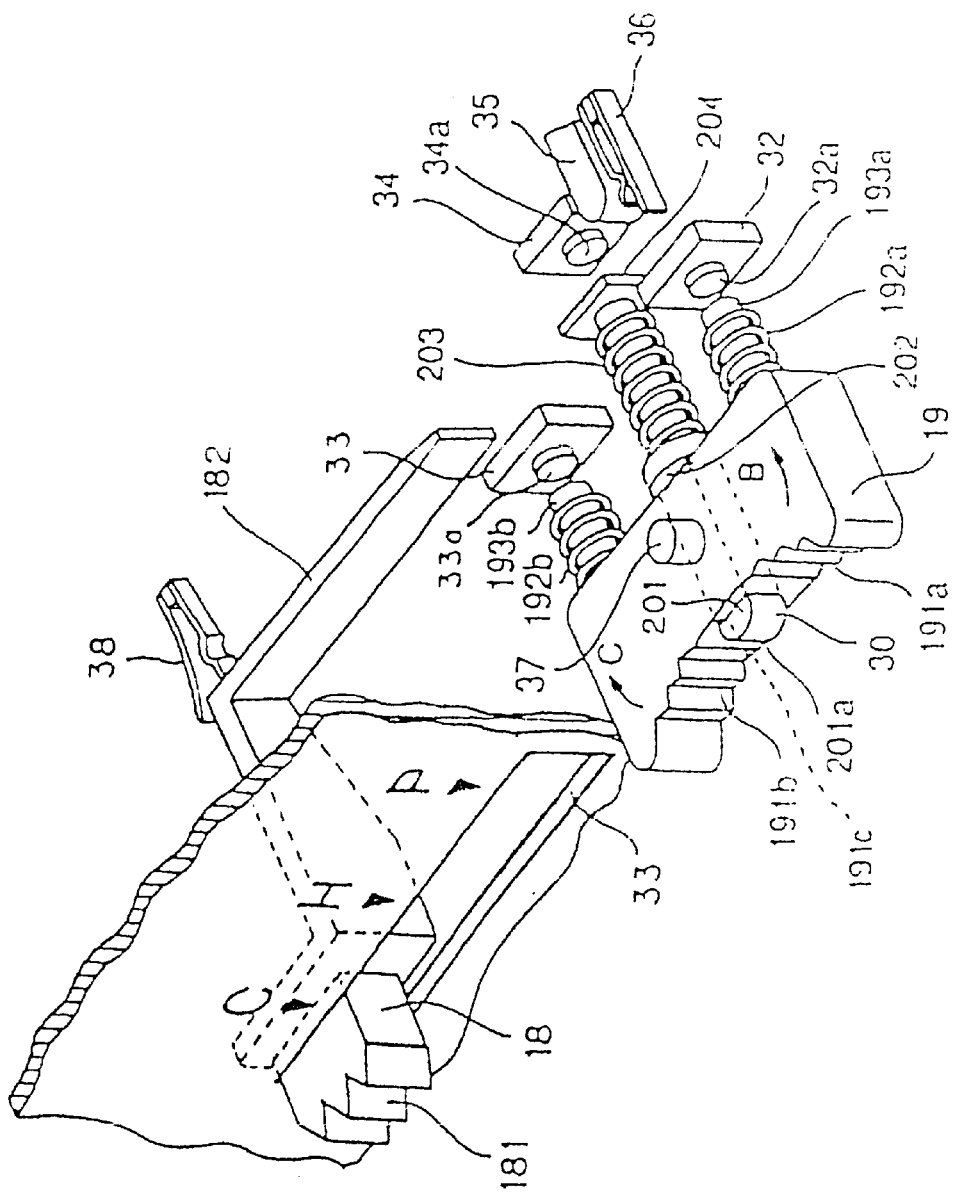

Another embodiment of the switch mechanism for an electronic zooming demand entry and print format designation will be hereafter described in conjunction with FIGS. 25 through 27 in which a print format designation switch 18 is in the "H" print format position, the "P" print format position and the "C" print format position, respectively.

The print format designation switch 18, which has an operating knob 181 projecting through a guide slot 31 formed in a rear wall of the camera body for access by the photographer, is movable to select "H", "P" and "C" print format positions. The print format position that the print format designation switch 18 selects is detected through combinations of statuses of a pair of normally closed leaf switches 36 and 38. A two-way optical zooming lever 19 is pivoted for rotation on a pivot shaft 37 secured to the camera body 30. Pushing the two-way optical zooming lever 19 at one of opposite ends 191a and 191b, for instance the end 191a, causes the two-way optical zooming lever 19 to turn in a counterclockwise direction B as viewed in the figure, so as to force a contact rod 193b against a coil spring 192a to come into contact with a switch contact 32a of a tact switch 32. While the switch contact 32a of the tact switch 32 remains contacted by the contact rod 193b, the optical zoom lens barrel 11 is driven to shift the optical zoom lens toward the telephoto end. Releasing the two-way optical zooming lever 19, the rod contact 193b is forced back by the coil spring 192a to return into its neutral position for disconnection from the switch contact 32a of the tact switch 32. Similarly, pushing the two-way optical zooming lever 19 at another end 191b causes the two-way optical zooming lever 19 to turn in a clockwise direction C as viewed in the figure to force a contact rod 193b against a coil spring 192b to come into contact with a switch contact 33b of a tact switch 33. While the switch contact 33b of the tact switch 33 remains contacted by the contact rod 193b, the zoom lens barrel 11 is driven to shift the optical zoom lens toward the wide-angle end. Releasing the two-way optical zooming lever 19, the rod contact 193b is forced back by the coil spring 192b to return into its neutral position for disconnection from the switch contact 33b of the tact switch 33. The two-way optical zooming lever 19 at its center is formed with a bore 191c in which a switch button 201 in a form of a push rod is inserted such that it is prevented from slipping off by a stopper ring 202. An acorn head 201a of the switch button 201 projects away from the surface of the two-way optical zooming lever. As shown in FIG. 25, when pushing the electronic zooming demand entry switch 20 at the switch button 201 against a coil spring 203 while the print format designation switch 18 is in the the "C" print format position or the "H" print format position, the switch contact 204 at the top of the switch button 201 is brought into contact with a switch contact 34a of a tact switch 34, making an entry of an electronic zooming demand. Releasing the switch button 201, the switch button 201 is forced back by the coil spring 203 to return into its neutral position, so as to turn off the electronic zooming demand entry switch 20. The entry of an electronic zooming demand is visually indicated by means of a symbol in a view finder for verification. The electronic zooming demand maintains entered even after turning off the electronic zooming demand entry switch 20. When pushing and releasing the electronic zooming demand entry switch 20, that is, turning on and off the tact switch 34 again after the entry of an electronic zooming demand, the entry of an electronic zooming demand is cancelled.

On the other hand, as shown in FIG. 26, when the print format designation switch 18 is moved in the "P" print format position, a generally L-shaped block lever 182 at its distal end 182a runs into between the switch contact 204 at the top of the switch button 201 and the tact switch 34, and then rides onto a stationary block 35. As a result, the switch contact 204 at the top of the switch button 201 is prevented from being brought into contact with the switch contact 34a of the tact switch 34 even when the electronic zooming demand entry switch 20 is operated. In the "P" print format position, the L-shaped block lever 182 at its end jaw 182b is brought into contact with a contact of a leaf switch 36 to open or turn off the leaf switch 36. By means of tuning off the leaf switch 36, the designation of the "P" print format is detected.

As shown in FIG. 27, when the print format designation switch 18 is moved in the "C" print format position, the generally L-shaped block lever 182 at its comer pushes the leaf switch 38 to open or turn off By means of turning off the leaf switch 38, the designation of the "C" print format is detected. Designation of the "H" print format through the print format designation switch 18 is detected by means of the state where both leaf switches 36 and 38 are on or closed.

The camera with the print format designation switch 18 and the electronic zooming demand entry switch 20 shown in FIGS. 25 through 27 installed therein has the same control circuit as that shown in FIG. 12 and performs an electronic zooming demand entry following the sequence routine shown by the flow chart in FIG. 13.

Figure 28:
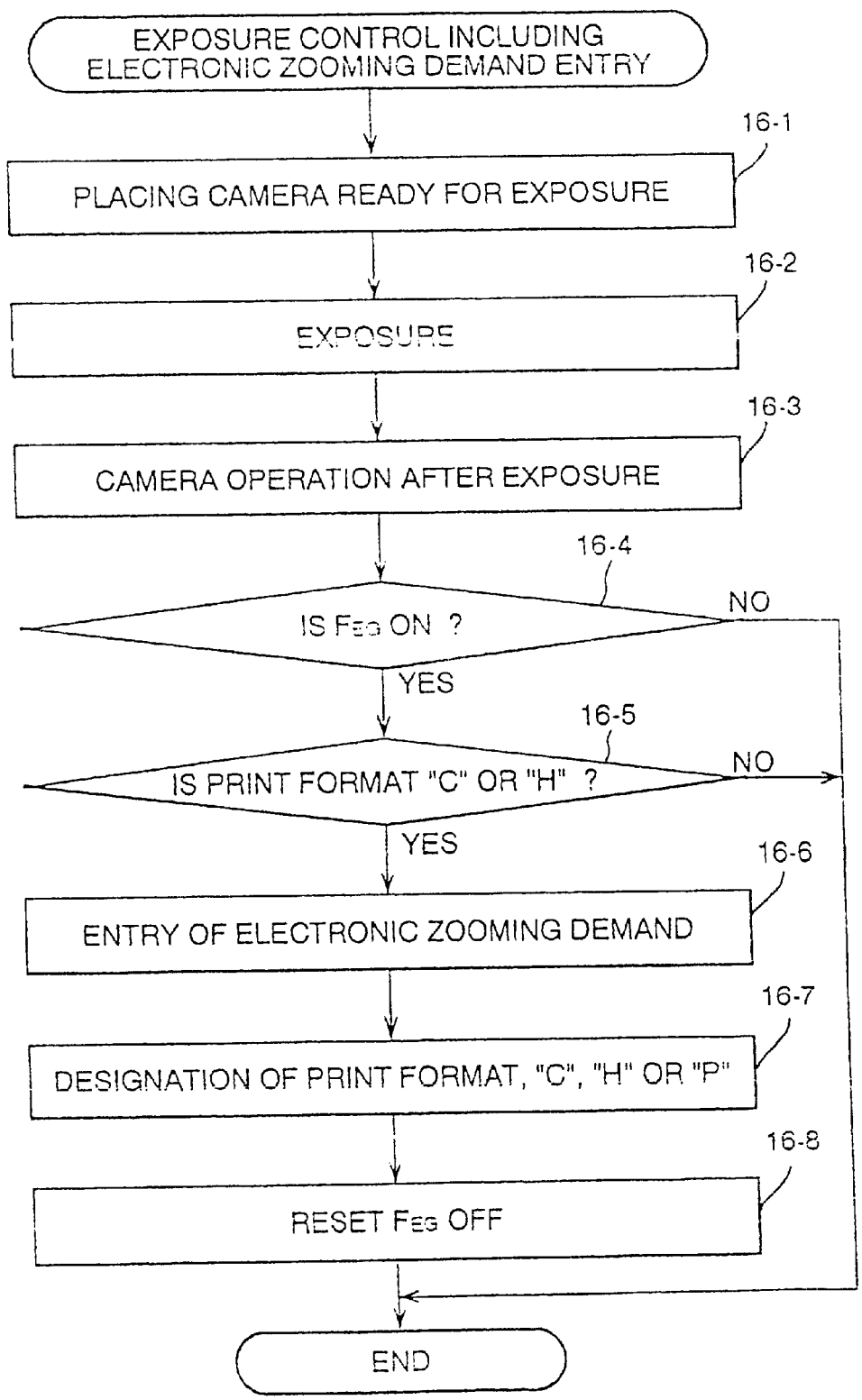
FIG. 28 is a flow chart illustrating a sequence routine of exposure control including an electronic zooming demand entry.

FIG. 28 is a flow chart illustrating a sequence routine of exposure control including electronic zooming demand entry. When a shutter button 16 (see FIGS. 1 and 2) is pushed down, the sequence logic commences and control proceeds to a function block at step 16-1 where the camera is placed ready for exposure by metering brightness of an object to be photographed for automatic exposure, automatically ranging a distance to the object and adjusting the zoom lens at the object distance, etc. Subsequently, the shutter is opened and closed to make exposure in synchronism with firing the electronic flash if necessary at step 16-2. After the exposure, necessary camera operation such as, for example, advancing the film strip 100 by one frame and counting up an exposure counter are made at step 16-3. During the advancement of the film strip 100 after exposure, an entry of an electronic zooming demand is controlled through steps 16-4 through 16-8. Specifically, a decision is made at step 16-4 as to whether an electronic zooming flag FEG is on. When the electronic zooming flag FEG, then another decision is made at step 16-5 as to whether both leaf switches 36 and 38 or at least the leaf switch 36 are on or remain closed, in other words, whether print format designation is directed to the "C" print format or the "H" print format. This decision is made for the reason that, as described in connection with the previous embodiment, there is a possibility that the print format designation switch 18 is operated to designate the "P" print format after operation of the electronic zooming demand entry switch 20 and, in such a case, it is necessary to prevent the entry of an electronic zooming demand even while the electronic zooming flag FEG remains up.

When at least the leaf switch 36 is on, this indicates that print format designation is directed the "C" print format or the "H" print format, then, the magnetic recording head driver in the driver IC 301 actuates the magnetic recording head 319 to record magnetic information indicative of the entry of an electronic zooming demand on the magnetic information recording area 102 of the exposed frame 110 at step 16-6. Absence of magnetic information on the magnetic information recording area 102 of an exposed frame 110 represents that there is no entry of an electronic zooming demand for the exposed frame 110. When the entry of an electronic zooming demand is recorded at step 16-6, when the electronic zooming flag FEG is off at step 16-4, or when print format designation is not directed to the "C" print format nor the "H" print format but to the "P" print format while the electronic zooming flag FEG is on at step 16-5, the magnetic recording head driver in the driver IC 301 actuates the magnetic recording head 319 to record magnetic information indicative of the designation of a print format on the magnetic information recording area 102 of the exposed frame 110 at step 16-7. Finally, after resetting off the electronic zooming flag FEG at step 16-8, the sequence logic terminates.

As described above, because the electronic zooming flag FEG is reset off at step 16-8 prior to exposure for the following exposure frame 110, the entry of an electronic zooming demand is effective only for an exposure frame that is intended to be exposed. Accordingly, whenever it is intended to enter an electronic zooming demand for the following exposure frame 110, the electronic zooming demand entry switch 20 must be operated to enter an electronic zooming demand for the following exposure frame before exposure. The entry of an electronic zooming demand is always effected simultaneously with designation of desired print formats excepting the "P" print format. When the maximum number of exposures available on the film strip 100 are exposed, the driver IC 301 actuates the film advancing motor 316 so as to rewind the film strip 100 into the film cartridge 50 completely. The film cartridge 50 with the exposed film strip 100 is removed from the camera 10 and given to a photofinisher for developing the exposure film strip 100 and making prints from the developed negative film strip 100 according to the electronic zooming demands in designated print formats.

Figure 29:
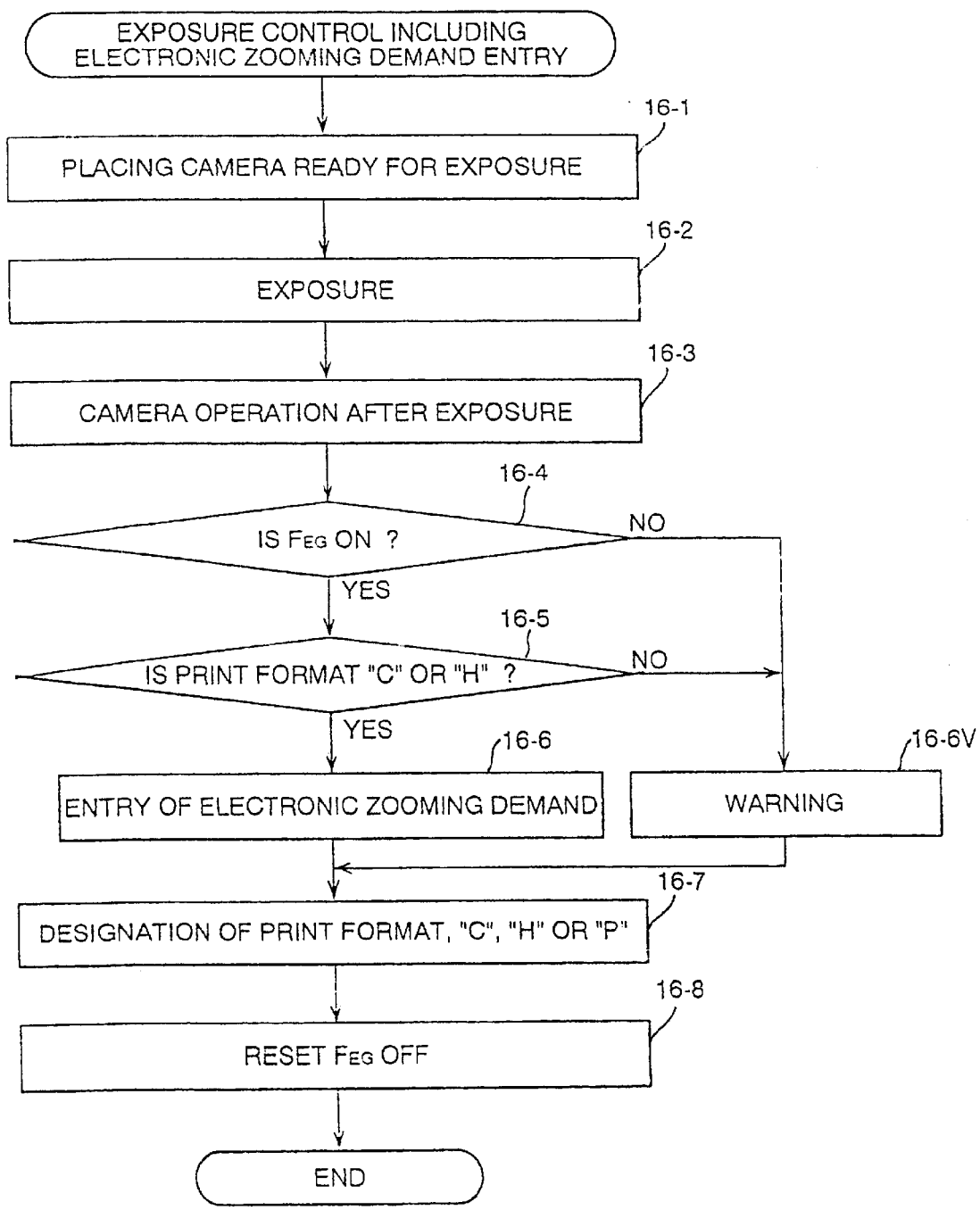
FIG. 29 is a flow chart illustrating another sequence routine of exposure control including an electronic zooming demand entry.
Figure 30:
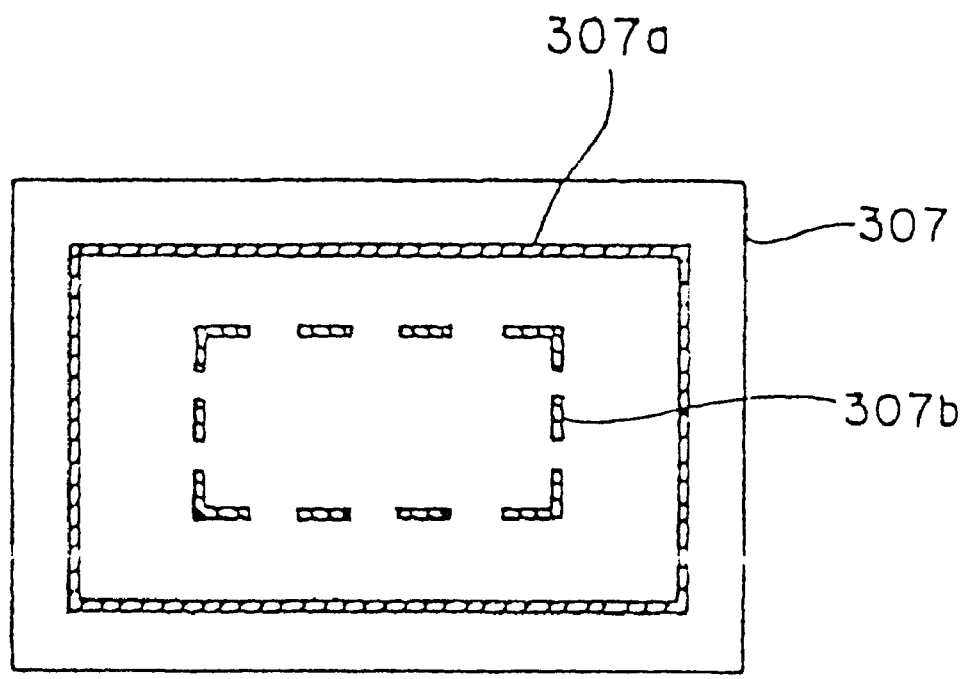
FIG. 30 is an illustration showing a view frame on an LCD.

FIG. 29 shows a flow chart illustrating a variation of the sequence routine of exposure control including electronic zooming demand entry shown in FIG. 28. In the sequence routine of exposure control including electronic zooming demand entry shown in FIG. 29 only a difference from that shown in FIG. 28 is additional step 16-5V where a warning is indicated on a liquid crystal display device (LCD) 307 (see FIGS. 12 and 30) disposed in the view finder when print format designation is directed to the "P" print format at step 16-5. As shown in FIG. 30 by way of example, the liquid crystal display device (LCD) 307 has a view frame 307a is displayed and used when no electronic zooming demand is entered and a view frame 307b is displayed and used when an electronic zooming demand is entered. During making prints, either an image of a scene in the view frame 307a or an image of a scene in the view frame 307b is printed according to whether an electronic zooming demand is entered or not. Although "C", "H" and "P" print formats are different from one another as described in connection with FIGS. 6 through 8, the view frame 307a is shown irrespectively of "C", "H" and "P" print formats for simplicity for the case where no electronic zooming demand is entered and, similarly, the view frame 307b is shown irrespectively of "C", "H" and "P" print formats for simplicity for the case where an electronic zooming demand is entered. Practically, either one of these view fields 307a and 307b is displayed on the liquid crystal display device (LCD) 307 in the view finder and each view frame 307a, 307b is appropriately sized according to "C", "H" and "P" print formats. When the "P" print format is designated, the view frame 307b is not displayed correspondingly to the "P" print format. At step 16-5V where the "P" print format is designated, the view frame 307a for no entry of an electronic zooming demand is displayed and simultaneously the view frame 307b for an entry of an electronic zooming demand flashes on and off, which gives the photographer a warning that, although both entry of an electronic zooming demand and designation of the "P" print format are made, the electronic zooming is not effected during making a print even if making exposure in this situation and a regular print is made from an image of a scene in the view frame 307a for no entry of an electronic zooming demand which is sized according to the "P" print format. This warning makes the photographer understand that the camera is set in the prohibited combination of an entry of an electronic zooming demand and designation of the "P" print format.

Figure 31:
FIG. 31 is an illustration showing a warning indication.

A warning may be displayed on a liquid crystal display device (LCD) attached to the exterior of the camera body in place of the liquid crystal display device (LCD) 307 in the view finder or in addition to the liquid crystal display device (LCD) 307. A design mark such as shown in FIG. 31 is displayed and flashes on and off on the exterior liquid crystal display device (LCD) when the camera is set in the prohibited combination of an entry of an electronic zooming demand and designation of the "P" print format and is continuously displayed on the exterior liquid crystal display device (LCD) when the camera is set in a combination of an entry of an electronic zooming demand and designation of the "C" print format or the "H" print format. Further, a light emitting diode (LED) flashing on and off or continuously tuning on may be employed to warning that the camera is set in the prohibited combination of an entry of an electronic zooming demand and designation of the "P" print format.

Figure 32:
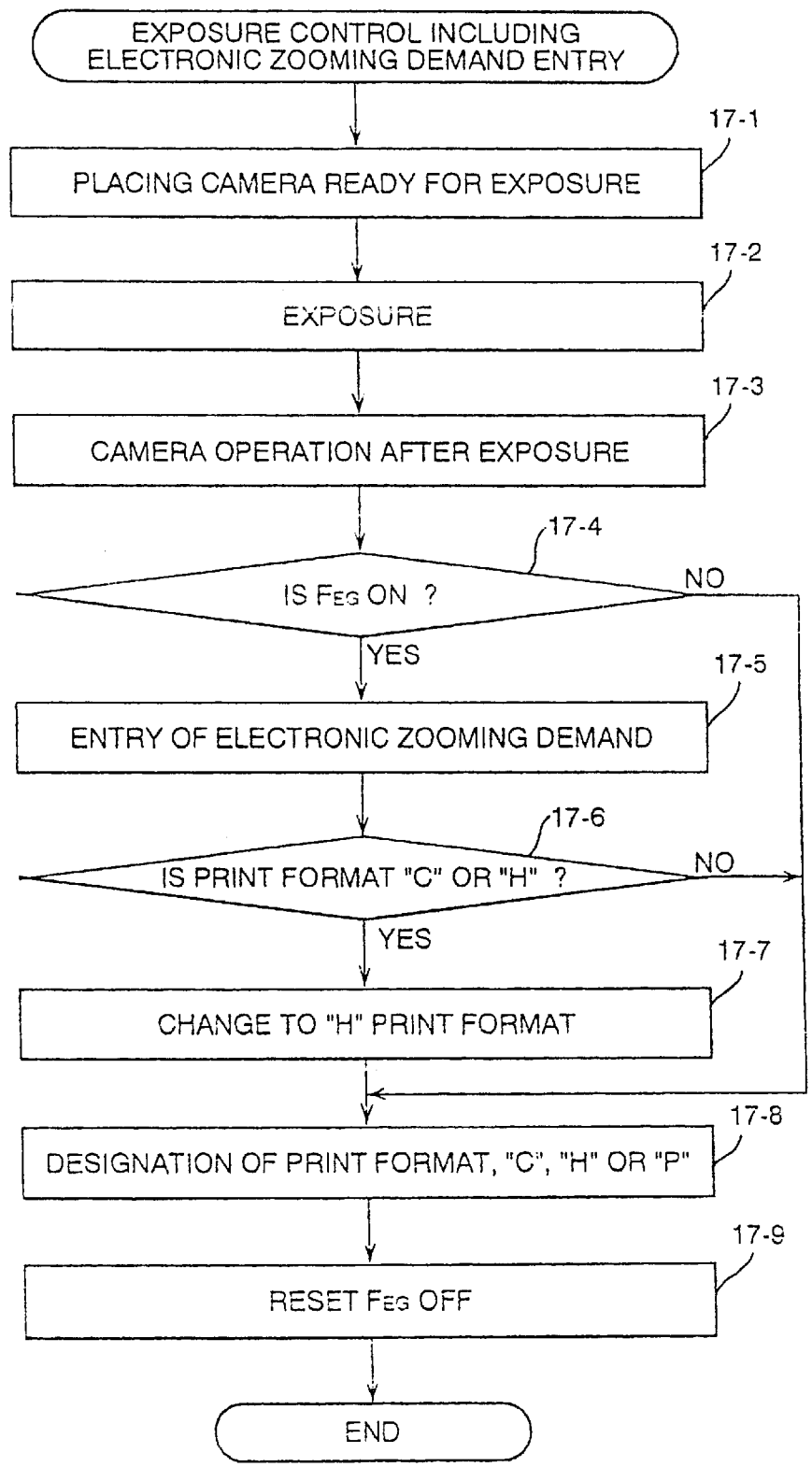
FIG. 32 us a flow chart illustrating another sequence routine of exposure control including an electronic zooming demand entry.

FIG. 32 is a flow chart illustrating a sequence routine of exposure control including electronic zooming demand entry which is used in place of the exposure control shown by the flow chart in FIG. 28. When the shutter button 16 is pushed down, the sequence logic commences and control proceeds to a function block at step 17-1 where the camera 10 is placed ready for exposure by metering brightness of an object to be photographed for automatic exposure, automatically ranging a distance to the object and adjusting the optical zoom lens at the object distance, etc. Subsequently, the shutter is opened and closed to make exposure in synchronism with firing the electronic flash if necessary at step 17-2. After the exposure, necessary camera operation such as, for example, advancing the film strip 100 by one frame and counting up an exposure counter are made at step 17-3. During the advancement of the film strip 100 after exposure, an entry of an electronic zooming demand is controlled through steps 17-4 through 17-9. Specifically, a decision is made at step 17-4 as to whether the electronic zooming flag FEG is on. When the electronic zooming flag FEG is on, then, the magnetic recording head driver in the driver IC 301 actuates the magnetic recording head 319 to record magnetic information indicative of the entry of an electronic zooming demand on the magnetic information recording area 102 of the exposed frame 110 irrespective of designation of print formats at step 17-5. Subsequently, another decision is made at step 17-6 as to whether designation of print format is directed to the "C" print format or the "H" print format. When print format designation is directed not to the "C" print format or the "H" print format but to the "P" print format, the print format designation is intentionally changed to the "H" print format at step 17-7. When the electronic zooming flag FEG is off at step 17-4, when print format designation is directed to the "C" print format or the "H" print format at step 17-6 while the electronic zooming flag FEG is on, or after intentionally changing the print format designation to the "H" print format at step 17-7, the magnetic recording head driver in the driver IC 301 actuates the magnetic recording head 319 to record magnetic information indicative of designation of a print format, "C", "H" or "P" print formats, on the magnetic information recording area 102 of an exposed frame 110 at step 17-8. In this instance, when the camera is set in the prohibited combination of an entry of an electronic zoming demand and designation of the "P" print format, designation of the "H" print format to which the designation of the "P" print format is changed at step 17-7 is recorded. Finally, after setting off the electronic zooming flag FEG at step 17-8, the sequence logic terminates.

Upon an occurrence of the prohibited combination of an entry of an electronic zooming demand and designation of the "P" print format, the entry of an electronic zooming demand is cancelled to escape the prohibited combination in the exposure control including electronic zooming demand entry shown in FIG. 28. However, in the exposure control including electronic zooming demand entry shown in FIG. 32, upon an occurrence of the prohibited combination of an entry of an electronic zooming demand and designation of the "P" print format, an entry of an electronic zooming demand is given priority over designation of a print format and designation of the "P" print format is intentionally changed to a print format, namely the "C" print format or the "H" print format, that is permitted to be designated in combination with an entry of an electronic zooming demand, so as thereby to escape the prohibited combination. It is preferred to indicate the intentional change in print format from the "P" print format to one of the others.

Figure 33:
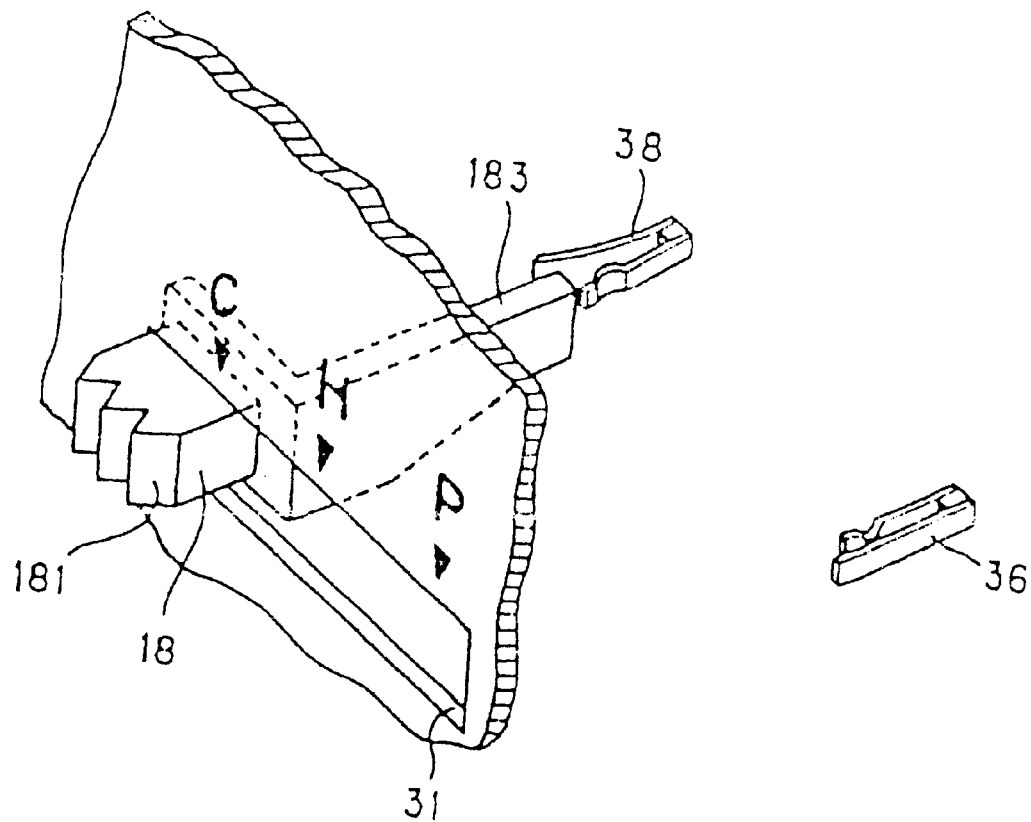
FIG. 33 is a perspective view of another print format designation switch.

FIG. 33 shows a variation of the print format designation switch 18 shown in FIG. 2. As shown in FIG. 23, a print format designation switch 18, which takes a form of a slide switch, has a knob 181 projecting through a guide slot 31 formed in a rear wall of a camera body. The knob 181 has a switch control lever 183 which is secured to the knob 181 and extends in the inside of the camera body. The knob 181 is movable to select three positions assigned to a "C" print format, an "H" print format and a "P" print format, respectively. When the print format designation switch 18 selects the "C" print format position to designate the "C" print format, the switch control lever 183 turns off or opens a normally closed leaf switch 36. When the print format designation switch 18 selects the "P" print format position to designate the "P" print format, the switch control lever 183 turns off or opens a normally closed leaf switch 38. Further, when the print format designation switch 18 selects the "H" print format position to designate the "H" print format, the switch control lever 183 is placed between the normally closed leaf switches 36 and 38, so as to leave the leaf switches 36 and 38 closed or turned on. The print format designation switch 18 shown in FIG. 33 is not provided with a block lever like the block lever 182 for preventing operation of the print format designation switch 18 shown in FIGS. 25 through 27. Even in the case where a combination of the print format designation switch 18 shown in FIG. 33 and the two-way optical zooming lever 19 and the electronic zooming demand entry switch 20 shown in FIG. 11 is employed in place of the switch mechanism which comprise the print format designation switch 18, the two-way optical zooming lever 19 and the electronic zooming demand entry switch 20 shown in FIGS. 25 through 27, in other words, even in the case where the print format designation switch 18 shown in FIG. 33 and the electronic zooming demand entry switch 20 themselves are able to operate regardless of the prohibited combination or not, the sequence routine of electronic zooming demand entry shown in FIG. 13 and the sequence routine of exposure control including electronic zooming demand entry shown in FIG. 28, 29 or 32 can be employed without any modifications to avoid the prohibited combination.

Figure 34:
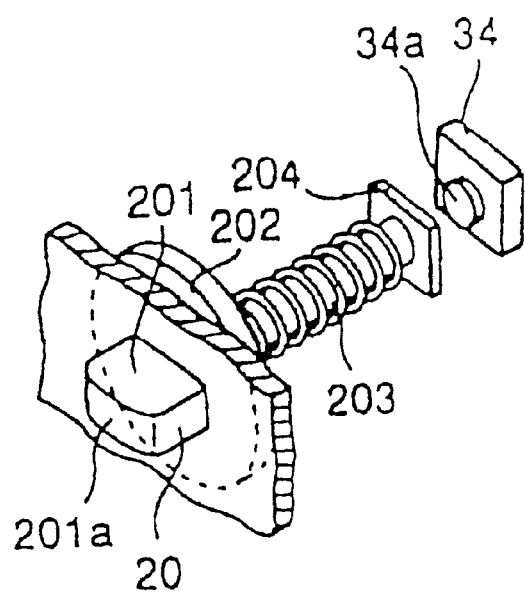
FIG. 34 is a perspective view showing another electronic zooming demand entry switch.

FIG. 34 shows a variation of the electronic zooming demand entry switch 20 shown in FIG. 11 which is available in combination with the print format designation switch 18 shown in FIG. 33. In FIG. 34 the two-way optical zooming lever 19 operative to shift the optical zoom lens between the wide-angle end and the telephoto end is omitted for simplicity and an easy understanding. The electronic zooming demand entry switch 20 is desirably installed into a camera which has an optical zooming lever provided separately from the electronic zooming demand entry switch 20 or a camera which is equipped with a taking lens having a n invariable focal length, and hence has no optical zooming lever. Although such a camera is different in outer appearance from those of the previous embodiments, the outer appearance itself is not the true nature of the present invention, so that a description and figures in this respect are not necessary.

In the above described embodiments, the electronic zooming demand entry switch 20 is adapted to enter an electronic zooming demand for a single magnification, such as, ×1.7. However, it is possible to enter multiple electronic zooming demands for magnifications, such as, ×1.5 and ×2.0. In such a case, if employing the switch mechanism shown in FIGS. 11, 25 through 27 or 34 as they are, the electronic zooming demand entry switch 20 is designed and adapted to make a circulation of entries of electronic zooming demands for magnifications ×1.5 and ×2.0 and withdrawal of the entry of an electronic zooming demand. Specifically, the electronic zooming demand entry switch 20 effects an entry of the electronic zooming demand for a magnification ×1.5 at first operation, an entry of the electronic zooming demand for a magnification ×2.0 at second operation, and withdrawal of the entry of the electronic zooming demand at third operation A zooming ratio of 1.5 is equivalent to a print magnification ×1.7 in the "P" print format as large as a print magnification in "C" or "H" print format. Accordingly, when a printer is allowed to print at relative print magnifications up to ×2.6, an entry of an electronic zooming demand for a zooming ratio of 1.5 in combination with designation of the "P" print format, which results in a print magnification ×2.55, is permissible. However, an entry of an electronic zooming demand for a zooming ratio of 2.0 in combination with the "P" print format, which results in a print magnification ×3.4, must be prohibited. If the printer is allowed to print at relative print magnifications up to ×2.0 for enhanced regular uniformity in print quality, an entry of an electronic zooming demand for a zooming ratio of 1.5, as well as a zooming ratio of 2.0, in combination of the "P" print format must be prohibited. For this reason, in the case where a circulation of entries of electronic zooming demands for 1.5 and 2.0 zooming ratios and withdrawal of the entry of the electronic zooming demand is effected through the electronic zooming demand entry switch 20, the entry of an electronic zooming demand in combination of the "P" print format is prohibited regardless of zooming ratios. Otherwise, for a camera equipped with the feature of the multi electronic zooming demand entry including the single electronic zooming demand entry, various types of switch mechanism may be employed without persisting in the switch mechanism shown in FIGS. 11, 25 through 27 or 34. For instance, a button switch that is adapted to make circular designation of "C", "H" and "P" print formats may be employed for the print format designation switch 18 in place of the slide switch. Further, a slide switch that is adapted to enter electronic zooming demands and withdrawal of the entry of an electronic zooming demand according to positions may be employed in place of the electronic zooming demand entry switch 20.

In place of the magnetic recording head 319 for recording magnetic information indicative of designation of print formats and/or an entry of an electronic zooming demands on the magnetic information recording areas 102 of a film strip 100, an optical recording device including a light source may be employed to optically record information regarding print formats and an entry of electronic zooming demands on the information recording area 102. An optical recording device including a light source may be employed to record information regarding print formats and an entry of electronic zooming demand on the information recording area 102 of the film 100 in place of the magnetic recording head 319.

As described above, the present invention realizes a camera equipped with both feature of an entry of an electronic zooming demand and designation of print formats without causing a possibility that a printer makes prints with images under permissible quality due to unreasonable print magnifications.

Although the camera of the invention has been described in the form of Advanced Photo System, the present invention is applied to cameras capable of recording information on a film loaded therein which are used to make different formats of prints from the film.

While the present invention has been described in terms of preferred embodiments, those skilled in the art recognize that the present invention can be practiced with various changes and modifications without departing the scope of the claims.

What is claimed is:

1. A camera of a type which is able to selectively designate a plurality of print formats for an exposed frame of a film loaded therein which is used to make a print from the exposed frame of the film after development in a designated print format by a printer and to enter an electronic zooming demand for an exposed frame of the film which is used to make a print from the exposed frame of the film after development at a demanded zooming ratio by the printer, the camera comprising:

an information recording device operative to record information on a film loaded in the camera;

a print format designation member movable between a plurality of positions assigned to a plurality of print formats, respectively, and operative to effect designation of the print formats according to the positions by causing the information recording device to record information regarding the print format for an exposed frame of the film on the film according to the position into which the print format designation member is moved;

an electronic zooming demand entry member operative to make a mechanical action through which an entry of an electronic zooming demand is effected for an exposed frame of the film by causing the information recording device to record information regarding the entry of an electronic zooming demand on the film; and a blocking mechanism operative to block the electronic zooming demand entry member so as to prevent the electronic zooming demand entry member from making the mechanical action while the print format designation member designates a specific one of the print formats or to permit the electronic zooming demand entry member to make the mechanical action while the print format designation member designates the remaining ones of the print formats other than the specific print format.

2. A camera as defined in claim 1, wherein the camera is of a type for use with a film adapted to Advanced Photo System and the print formats include at least a panoramic print format as the specific format, a conventional print format and a high vision print format.

3. A camera as defined in claim 1, wherein the print format designating member slides between the position for the specific print format and the positions for the remaining print formats and the blocking mechanism prevents the mechanical action of the electronic zooming demand entry member in the position for the specific print format or permits the mechanical action of the electronic zooming demand entry member in the positions for the remaining print formats.

4. A camera as defined in claim 3, wherein blocking mechanism comprises a blocking lever which is formed as a part of the print format designation member and is placed in a path of the mechanical action of the electronic zooming demand entry member so as thereby to prevent the mechanical action of the electronic zooming demand entry member in the position for the specific print format.

5. A camera as defined in claim 1, and further comprising a power-driven zoom lens installed to the camera and capable of shifting in focal length and an optical zooming member capable of rocking in opposite directions about a pivot axis perpendicular to an optical axis of the zoom lens to drive the zoom lens in opposite directions along the optical axis between a telephoto end and a wide-angle end, wherein the electronic zooming demand entry member comprises a push button installed in the optical zooming member in an approximately center position of the optical zooming member.

6. A camera as defined in claim 5, wherein the electronic zooming demand entry member at an outside end projects away from an outside surface of the optical zooming member in the direction so as to move toward the first operating member.

7. A camera as defined in claim 5, wherein the electronic zooming demand entry member and the optical zooming member are colored differently.

8. A camera of a type which is able to selectively designate a plurality of print formats for an exposed frame of a film loaded therein which is used to make a print from the exposed frame of the film after development in a designated print format by a printer and to enter an electronic zooming demand for an exposed frame of the film which is used to make a print from the exposed frame of the film after development at a demand zooming ratio by the printer, the camera comprising:

an information recording device operative to record information on a film loaded in the camera;

a print format designation member movable between a plurality of positions assigned to different print formats, respectively, and operative to effect designation of the print format for an exposed frame of the film according to the positions by causing the information recording device to record information regarding the position into which the print format designation member is moved on the film;

refusing means for refusing a combination of the entry of the electronic zooming demand and designation of a specific one of the print formats;

a power-driven zoom lens installed to the camera and capable of shifting in focal length;

an optical zooming member disposed on a body of the camera capable of rocking in opposite directions about a pivot axis perpendicular to an optical axis of the zoom lens to drive the zoom lens in opposite directions along the optical axis between a telephoto end and a wide-angle end; and an electronic zooming demand entry member disposed within a bore of the optical zooming member so that the electronic zooming demand entry member can move linearly through the bore along an axis generally parallel to the optical axis to effect an entry of an electronic zooming demand for the exposed frame of the film by causing the information recording device to record information regarding the electronic zooming demand on the film.

9. A camera as defined in claim 8, wherein the electronic zooming demand entry member at an outside end projects away from an outside surface of the optical zooming member.

10. A camera as defined in claim 9, wherein the electronic zooming demand entry member and the optical zooming member are colored differently.

11. A camera as defined in claim 10, wherein the camera is of a type for use with a film adapted to Advanced Photo System and the print formats include at least a panoramic print format as the specific format, a conventional print format and a high vision print format.

12. A camera equipped with a power-driven zoom lens installed thereto; the camera comprising:

an information recording device operative to record information on a film loaded in the camera;

an optical zooming member capable of rocking in opposite directions about a pivot axis perpendicular to an optical axis of the zoom lens to drive the zoom lens in opposite directions along the optical axis between the telephoto end and a wide-angle end; and an electronic zooming demand entry member disposed within a bore of the optical zooming member so that the electronic zooming demand entry member can move linearly through the bore along an axis generally parallel to the optical axis so that the electronic zooming demand entry member, when moved, effects an entry of an electronic zooming demand for an exposed frame of the film by causing the information recording device to record information regarding the entry of an electronic zooming demand on the film.

13. A camera as defined in claim 12, wherein the electronic zooming demand entry member at an outside end projects away from an outside surface of the optical zooming member.

14. A camera as defined in claim 13, wherein the electronic zooming demand entry member and the optical zooming member are colored differently.

* * * * *